United States Patent
Chamberlain et al.

(10) Patent No.: US 12,351,522 B2
(45) Date of Patent: Jul. 8, 2025

(54) THERMAL AND/OR ENVIRONMENTAL BARRIER COATING SYSTEM

(71) Applicants: Rolls-Royce Corporation, Indianapolis, IN (US); University of Virginia, Charlottesville, VA (US); University of Virginia Patent Foundation, University of Virginia, VA (US)

(72) Inventors: Adam Lee Chamberlain, Mooresville, IN (US); Elizabeth J. Opila, Charlottesville, VA (US); Mackenzie J. Ridley, Knoxville, TN (US)

(73) Assignees: Rolls-Royce Corporation, Indianapolis, IN (US); University of Virginia Patent Foundation, Charlottesville, VA (US)

(*) Notice: Subject to any disclaimer, the term of this patent is extended or adjusted under 35 U.S.C. 154(b) by 791 days.

(21) Appl. No.: 16/723,675

(22) Filed: Dec. 20, 2019

(65) Prior Publication Data

US 2020/0199027 A1    Jun. 25, 2020

Related U.S. Application Data

(60) Provisional application No. 62/938,748, filed on Nov. 21, 2019, provisional application No. 62/784,067, filed on Dec. 21, 2018.

(51) Int. Cl.
*C04B 35/622* (2006.01)
*C04B 35/16* (2006.01)
(Continued)

(52) U.S. Cl.
CPC ........ *C04B 35/62222* (2013.01); *C04B 35/16* (2013.01); *C04B 35/6261* (2013.01);
(Continued)

(58) Field of Classification Search
CPC ........ C04B 35/62222; C04B 35/62695; C04B 35/16; C04B 35/6261
(Continued)

(56) References Cited

U.S. PATENT DOCUMENTS

| | | |
|---|---|---|
| 9,890,089 B2 | 2/2018 | Kirby et al. |
| 2006/0014029 A1 | 1/2006 | Saak et al. |

(Continued)

FOREIGN PATENT DOCUMENTS

| | | |
|---|---|---|
| EP | 1044947 A2 | 10/2000 |
| EP | 2918698 A1 | 9/2015 |

(Continued)

OTHER PUBLICATIONS

Zhilin Tian, et. al.; Theroretical and experimental determination of the major thermo-mechanical properties of RE2SiO5 (RE+Tb, Dy, Ho, Er, Tm, Yb, Lu, and Y) for environmental and thermal barrier coating applications, Sep. 26, 2015; Journal of the European Ceramic Society, 36, pp. 189-202 (Year: 2023).*

(Continued)

*Primary Examiner* — Tahseen Khan
(74) *Attorney, Agent, or Firm* — Shumaker & Sieffert, P.A.

(57) ABSTRACT

An article may include a substrate and a coating system on the substrate. The coating system may include a thermal and/or environmental barrier coating (T/EBC) layer, wherein the T/EBC layer includes a silicate phase including more than one metal cation.

16 Claims, 25 Drawing Sheets

(51) Int. Cl.
*C04B 35/626* (2006.01)
*C23C 4/11* (2016.01)

(52) U.S. Cl.
CPC .......... *C04B 35/62695* (2013.01); *C23C 4/11* (2016.01); *C04B 2235/3427* (2013.01); *C04B 2235/3436* (2013.01); *C04B 2235/5445* (2013.01); *C04B 2235/9607* (2013.01); *C04B 2235/9669* (2013.01)

(58) Field of Classification Search
USPC ........................................................ 428/702
See application file for complete search history.

(56) References Cited

U.S. PATENT DOCUMENTS

| | | | |
|---|---|---|---|
| 2006/0078750 A1 | 4/2006 | Zhu et al. | |
| 2006/0121293 A1 | 6/2006 | Boutwell et al. | |
| 2010/0080984 A1 | 4/2010 | Lee | |
| 2010/0159261 A1 | 6/2010 | Kirby et al. | |
| 2011/0033630 A1 | 2/2011 | Naik et al. | |
| 2011/0203281 A1* | 8/2011 | Sarrafi-Nour | C04B 41/89 60/722 |
| 2013/0136915 A1 | 5/2013 | Naik | |
| 2013/0189531 A1 | 7/2013 | Lee | |
| 2014/0255680 A1 | 9/2014 | Lee et al. | |
| 2014/0261080 A1 | 9/2014 | Lee | |
| 2016/0003092 A1* | 1/2016 | Chamberlain | C04B 41/009 428/323 |
| 2017/0022113 A1 | 1/2017 | Opila | |
| 2017/0044930 A1* | 2/2017 | Luthra | C04B 41/52 |
| 2018/0037515 A1* | 2/2018 | Matsumoto | C04B 41/009 |
| 2018/0363476 A1 | 12/2018 | Hafner et al. | |
| 2018/0370862 A1 | 12/2018 | Kirby et al. | |
| 2019/0284673 A1 | 9/2019 | Landwehr et al. | |
| 2020/0123071 A1 | 4/2020 | Ndamka et al. | |
| 2021/0070661 A1* | 3/2021 | Allimant | C01B 33/20 |

FOREIGN PATENT DOCUMENTS

| | | | | |
|---|---|---|---|---|
| EP | 3130577 A1 | 2/2017 | | |
| EP | 3243809 A1 | 11/2017 | | |
| EP | 3243925 A1 | 11/2017 | | |
| EP | 3670481 A1 | 6/2020 | | |
| WO | WO-2019149856 A1 * | 8/2019 | ............ | C01B 33/20 |
| WO | 2020047278 A1 | 3/2020 | | |

OTHER PUBLICATIONS

Laura R. Turcer, Towards multifunctional thermal environmental barrier coatings (TEBCs) based on rare-earth pyrosilicate solid-solution ceramics, 2018, Scripta Materialia; 154, pp. 111-117 (Year: 2023).*
Al-Nasiri et. al.; Thermal Properties of Rare-Earth Monosilicates for EBC on Si-Based Ceramic Composites; Dec. 2016; The American Ceramic Society; 99[20 589-596 (Year: 2024).*
Richards, "Ytterbium Silicate Environmental Barrier Coatings," Dissertation Presented to the Faculty of the School of Engineering and Applied Science University of Virginia, May 2015, 322 pp.
Rost et al., "Entropy-Stabilized Oxides," Nature Communications, Sep. 29, 2015, 8 pp.
Turcer et al., "Towards Multifunctional Thermal Environmental Barrier Coatings (TEBCs) Based on Rare-Earth Pyrosilicate Solid-Solution Ceramics," Scripta Materialia, vol. 154, May 20, 2018, 7 pp.
Costa et al., "Mass Spectrometric Measurements of the Silica Activity in the Yb2O3—SiO2 System and Implications to Assess the Degradation of Silicate-Based Coatings in Combustion Environments," Journal of the European Ceramic Society, Aug. 2015, 9 pp.
Han et al., "Study on Water Vapor Corrosion Resistance of Rare Earth Monosilicates RE2SiO5 (RE [ Lu, Yb, Tm, Er, Ho, Dy, Y, and Sc) From First-Principles Calculations," Elsevier, vol. 4, Oct. 10, 2018, 13 pp.
Zheng et al., "Theoretical and Experimental Determination of the Major Thermo-Mechanical Properties of RE2SiO5 (RE=Tb, Dy, Ho, Er, Tm, Yb, Lu, and Y) for Environmental and Thermal Barrier Coating Applications," Journal of the European Ceramic Society, vol. 36, Jan. 2016, pp. 189-202.
He, "Rapid Thermal Conductivity Measurement with a Hot Disk Sensor Part 1. Theoretical Considerations," Thermochimica Acta, vol. 436, No. 1, Oct. 2005, pp. 122-129.
Cahill, "Thermal Conductivity Measurement From 30 to 750 K: the 3£0 Method," Review of Scientific Instruments, vol. 61, No. 2, Feb. 1990, pp. 802-808.
Hull, "Accuracy, Precision, and Confidence in X-ray Fluorescence for Positive Material Identification," The NDT Technician, vol. 16, No. 1, Jan. 2017, 6 pp.
Lee et al., "Rare Earth Silicate Environmental Barrier Coatings for SiC/SiC Composites and Si3N4 Ceramics," Journal of the European Ceramic Society, vol. 25, Dec. 2005, pp. 1705-1715.
Nan et al., "Effective Thermal Conductivity of Particulate Composites with Interfacial Thermal Resistance," Journal of Applied Physics, vol. 81, No. 10, May 15, 1997, pp. 6692-6699.
Sun et al., "Thermal Properties of Single-Phase Y2SiO5," Journal of the European Ceramic Society, vol. 29, Mar. 2009, pp. 551-557.
Gild et al., "High-Entropy Fluorite Oxides," Journal of the European Ceramic Society, vol. 38, Apr. 2018, pp. 3578-3584.
Gild et al., "A High-Entropy Silicide: (Mo0.2Nb0.2Ta0.2Ti0.2W0.2)Si2," Journal of Materiomics, Version 1.0, Feb. 3, 2019, 14 pp.
Ramasamy et al., "EBC Development for Hot-Pressed Y2O3/Al2O3 Doped Silicon Nitride Ceramics," Materials Science and Engineering: A-Structural Materials Properties Microstructure and Processing, vol. 527, Aug. 20, 2010, 8 pp.
Hu et al., "Phase Evolution of Reactive Sputtering Synthesized Holmium Silicate Coatings," Journal of the American Ceramic Society, vol. 102, Jul. 6, 2018, 8 pp.
Response to Extended Search Report dated May 12, 2020, from counterpart European Application No. 19219139.3, filed Dec. 21, 2020, 49 pp.
Ren Xiaomin et al: "Equiatomic quaternary (YI/4Hol/4Erl/4Ybl/4)2SiO5silicate: A perspective multifunctional thermal and environmental barrier coating material". Scripta Materialia. vol. 168. Apr. 24, 2019 (Apr. 24, 2019). pp. 47-50.
Tian Zhi Lin et al: "General trend on the phase stability and corrosion resistance of rare earth monosilicates to moltencalcium-magnesium-aluminosilicate at 1300oC". Corrosion Science. vol. 148. Mar. 1, 2019 (Mar. 1, 2019). pp. 281-292.
Al Nasiri et al., "Thermal Properties of Rare-Earth Monosilicates for EBC on Si-Based Ceramic Composites," Journal of the American Ceramic Society, vol. 99, No. 2, Feb. 2016, pp. 589-596.
Ochrombel et al. "Thermal Expansion of EB-PVD Yttria Stabilized Zirconia," Journal of the European Ceramic Society, vol. 30, No. 12, Sep. 2010, pp. 2491-2496.
Ridley et al., "Tailoring Thermal Properties of EBCs in High Entropy Rare Earth Monosilicates," Acta Materialia, Manuscript No. A-20-88, Jan. 6, 2020, 31 pp.
Ridley et al., "Tailoring Thermal Properties of Multi-Component Rare Earth Monosilicates," Acta Materialia, vol. 195, Aug. 2020, pp. 698-707.
U.S. Appl. No. 17/350,663, filed Jun. 17, 2021, by Golden et al.
U.S. Appl. No. 17/350,827, filed Jun. 17, 2021, by Golden et al.
Extended Search Report from counterpart European Application No. 19219139., dated May 12, 2020, 7 pp.
Office Action from U.S. Appl. No. 17/350,827 dated Sep. 9, 2022, 21 pp.
Response to Office Action dated Sep. 9, 2022 from U.S. Appl. No. 17/350,827, filed Dec. 9, 2022, 16 pp.
Communication pursuant to Article 94(3) EPC from counterpart European Application No. 19219139.3 dated Feb. 6, 2023, 6 pp.
Final Office Action from U.S. Appl. No. 17/350,827 dated Mar. 1, 2023, 16 pp.

(56) References Cited

OTHER PUBLICATIONS

Response to Communication pursuant to Article 94(3) EPC dated Feb. 6, 2023, from counterpart European Application No. 19219139.3 filed Jun. 1, 2023, 8 pp.
Response to Final Office Action dated Mar. 1, 2023 from U.S. Appl. No. 17/350,827, filed Jun. 1, 2023, 9 pp.
Communication pursuant to Article 94(3) EPC from counterpart European Application No. 19219139.3 dated Nov. 17, 2023, 5 pp.
Office Action from U.S. Appl. No. 17/350,827 dated Jul. 28, 2023, 16 pp.
Office Action from U.S. Appl. No. 17/350,663 dated Oct. 5, 2023, 24 pp.
Response to Office Action dated Jul. 28, 2023 from U.S. Appl. No. 17/350,827, filed Dec. 28, 2023, 8 pp.
Response to Office Action dated Oct. 5, 2023 from U.S. Appl. No. 17/350,663, filed Jan. 5, 2024, 19 pp.
Notice of Allowance from U.S. Appl. No. 17/350,663 dated Mar. 18, 2024, 9 pp.
Response to Communication pursuant to Article 94(3) EPC dated Nov. 17, 2023, from counterpart European Application No. 19219139.3 filed Mar. 7, 2024, 10 pp.
Response to Office Action dated Feb. 20, 2024 from U.S. Appl. No. 17/350,663, filed Mar. 5, 2024, 5 pp.
Notice of Allowance from U.S. Appl. No. 17/350,827 dated Jan. 24, 2024, 9 pp.
Corrected Notice of Allowance from U.S. Appl. No. 17/350,827 dated Feb. 29, 2024, 5 pp.

* cited by examiner

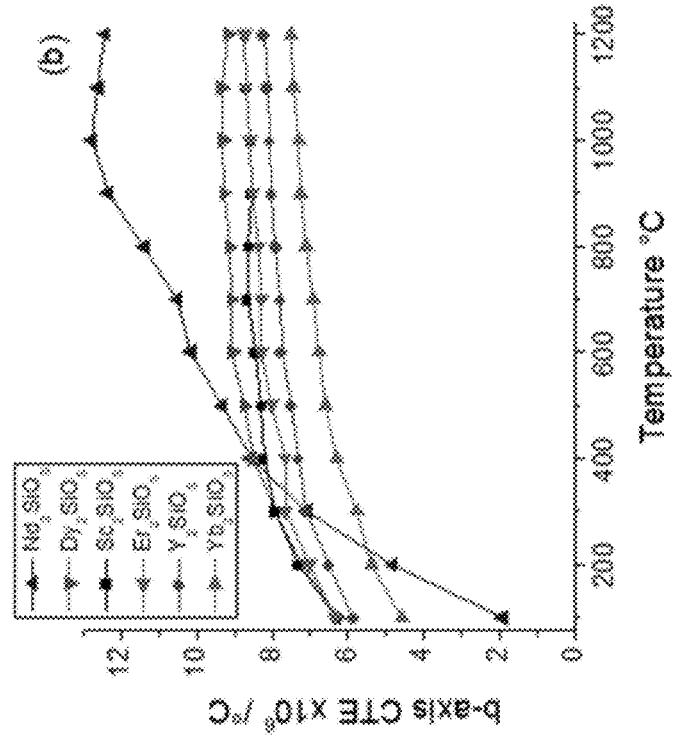
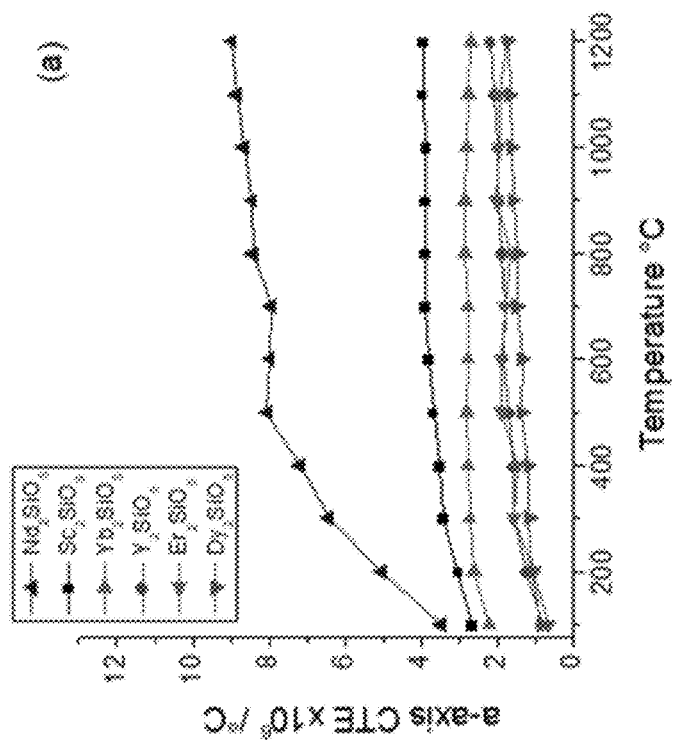
FIG. 17a
FIG. 17b

THERMAL AND/OR ENVIRONMENTAL BARRIER COATING SYSTEM

This application claims the benefit of U.S. Provisional Patent Application No. 62/784,067, filed Dec. 21, 2018 and U.S. Provisional Patent Application No. 62/938,748, filed Nov. 21, 2019. The entire content of each application is incorporated by reference herein.

TECHNICAL FIELD

The present disclosure generally relates to, in some examples, coating systems for high-temperature mechanical systems, such as gas turbine engines.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcia-Magnesia-Alumina Silicate (CMAS) containing materials, an abradable coating to improve a seal, or combinations thereof.

SUMMARY

The disclosure describes articles, systems, and techniques relating to a thermal and/or environmental barrier coating (T/EBC) system. The T/EBC system may include a T/EBC layer, where the layer includes at least one silicate phase incorporating more than one metal cation into the crystal lattice of the silicate phase. The silicate phase(s) may be a monosilicate and/or disilicate phase, and the multiple metal cations incorporated into the crystal structure of the silicate phase(s) may be rare metals, transition metals, and/or alkaline earth metals. As will be described below, such T/EBC layer compositions may allow for tailoring or otherwise modifying properties of the T/EBC layer to provide for desirable layer properties, such as, thermal conductivity, thermal expansion, water vapor stability, and/or stability to other environmental factors (e.g., CMAS resistance or hot corrosion resistance). The properties of such a T/EBC layer may be different than a T/EBC layer including silicate phase(s) including only a single metal cation into the crystal structure.

In one example, the disclosure relates to an article comprising a substrate; and a coating system on the substrate, wherein the coating system includes a thermal and/or environmental barrier coating (T/EBC) layer, wherein the T/EBC layer includes a silicate phase including more than one metal cation.

In another example, the disclosure relates to a method comprising forming a coating system on a substrate, wherein the coating system including a thermal and/or environmental barrier coating (T/EBC) layer, and wherein the T/EBC layer includes a silicate phase including more than one metal cation.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
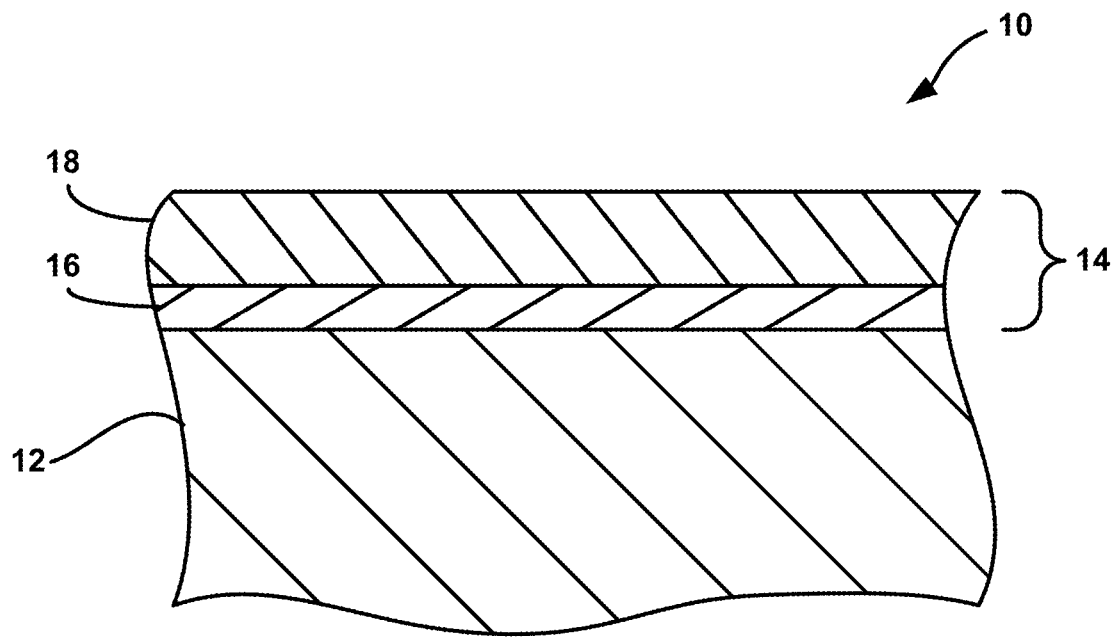
FIGS. 1A and 1B are conceptual diagrams illustrating example articles including a substrate and a coating system including a T/EBC layer in accordance with the disclosure.

The disclosure describes articles, systems, and techniques relating to a coating system (e.g., a T/EBC system) including a T/EBC layer. The coating system may be formed on a CMC substrate and may provide increased protection against Calcia-Magnesia-Alumina Silicate (CMAS), oxidation resistance, water vapor resistance, and/or the like to the CMC substrate and coating system. The T/EBC layer of the coating system may be configured as an abradable T/EBC or non-abradable T/EBC (e.g., based on the porosity of the T/EBC, among others).

In the context of gas turbine engines, increasing demands for greater operating efficiency (e.g., fuel efficiency) has led to the operation of gas turbine engines at higher temperatures. In some examples, substrates of high-temperature mechanical systems are coated with a T/EBC to provide environmental protection for the underlying substrate material(s) in a high temperature environment. The T/EBC may have a porous or a columnar microstructure (e.g., a microstructure including a plurality of voids). In some examples, the T/EBC may be substantially dense, e.g., to reduce infiltration of CMAS and/or water vapor.

The increased operating temperatures, however, may lead to increased damage due to the presence of CMAS deposits within the high temperature environments. The presence of CMAS deposits in the high temperature environments of a gas turbine engine may result from the ingestion of siliceous minerals (e.g., airborne dust, sand, volcanic dust and ashes, fly ash, runway debris, concrete dust, fuel residue, and the like) in the intake gas drawn through the gas turbine engine.

In some examples, a T/EBC layer (e.g., on a SiC/SiC substrate) may be formed of one or more rare earth silicates. For example, the T/EBC layer may be formed of single rare earth silicate with one rare earth metal cation or a combination of rare earth silicates, each with a single rare earth metal cation, contained in multiple phases. However, each of the phases may only contain a single rare earth silicate in the silicate phase. In each case, the T/EBC layer may exhibit properties such as thermal expansion, thermal conductivity, water vapor stability, and stability to other environmental factors (e.g., CMAS resistance and/or hot corrosion resistance). Such properties may be limited by being tied to a single rare earth silicate. In some examples, it may be desirable to further tailor such properties to provide an improved T/EBC layer.

In accordance with examples of the disclosure, T/EBC systems may include a T/EBC layer including one or more silicate phases, where each silicate phase includes multiple metal cations in the crystal lattice of the silicate phase. For example, the T/EBC layer may include only a single silicate phase that includes multiple metal cations. As another example, the T/EBC layer may include multiple silicate phases, where each of the multiple silicate phases includes multiple metal cations incorporated into the crystal lattice of the silicate phase, e.g., where each silicate phase incorporates the same metal cations in the crystal lattice of the silicate phases. Example metal cations incorporates into the silicate phase(s) may include rare earth metals, transition metals, and/or alkaline earth metals. In some examples, the selection of multiple cations that produce a T/EBC layer containing silicate phase(s) incorporating multiple cations into the crystal lattice of the silicate phase(s) may provide for increased ability to tailor properties of the T/EBC layer (e.g., as compared to a T/EBC layer containing silicate phase(s) with only a single metal cation). The tailoring of such properties may provide for desirable thermal expansion, thermal conductivity, water vapor stability, and stability to other environmental factors (e.g., CMAS resistance and/or hot corrosion resistance).

As will be described herein, examples of the disclosure may include T/EBC layers that are alloyed and/or entropy stabilized by incorporating multiple cations into the crystal structure of the silicate phase. Alloying may entail mixing of two or more constituents, and may or may not be a single phase, e.g., more than one rare earth silicate phase. A solid solution is a mixture of two or more constituents that form a single phase, for example, a mixture of two rare earth silicates that combine to form with a single crystal structure and the rare earth species randomly mix on a given crystal lattice site. High entropy may refer to a chemical state with a large degree of chemical disorder, for example, the entropy contribution to the overall rare earth silicate coating stability increases as the number of rare earth species increases from one to two, three, four, or five. Entropy stabilized may refer to a state where the high degree of chemical disorder results in the formation of a single phase that is more stable than the sum of the individual components and is characterized by random mixing at all length scales, and the input of energy is required to achieve this state. The energetics can be determined using calorimetry. While not being bound by theory, the alloying and/or entropy stabilization of a T/EBC layer by incorporating multiple metal cations into the crystal structure of the silicate phase may provide enough atomic disorder (increased entropy) to stabilize a solid solution of the multi-cation rare earth silicate.

FIG. 1 is a conceptual diagram illustrating an example article 10 including a substrate 12 and a T/EBC coating system 14. T/EBC coating system includes an optional bond coat 16 and T/EBC layer 18. In some examples, article 10 may include a component of a gas turbine engine. For example, article 10 may include a part that forms a portion of a flow path structure, a seal segment, a blade track, an airfoil, a blade, a vane, a combustion chamber liner, or another portion of a gas turbine engine. Although not shown in FIG. 1, T/EBC layer 18 may include a plurality of voids (e.g., pores, intercolumnar voids, cracks, and/or the like) within the layer.

Substrate 12 may include a material suitable for use in a high-temperature environment. In some examples, substrate 12 may include a ceramic or a ceramic matrix composite (CMC). Suitable ceramic materials, may include, for example, a silicon-containing ceramic, such as silica ($SiO_2$) and/or silicon carbide (SiC); silicon nitride ($Si_3N_4$); alumina ($Al_2O_3$); an aluminosilicate; a transition metal carbide (e.g., WC, $Mo_2C$, TiC); a silicide (e.g., $MoSi_2$, $NbSi_2$, $TiSi_2$); combinations thereof; or the like. In some examples in which substrate 12 includes a ceramic, the ceramic may be substantially homogeneous.

In examples in which substrate 12 includes a CMC, substrate 12 may include a matrix material and a reinforcement material. The matrix material may include, for example, silicon metal or a ceramic material, such as silicon carbide (SiC), silicon nitride ($Si_3N_4$), an aluminosilicate, silica ($SiO_2$), a transition metal carbide or silicide (e.g., WC, $Mo_2C$, TiC, $MoSi_2$, $NbSi_2$, $TiSi_2$), or another ceramic material. The CMC may further include a continuous or discontinuous reinforcement material. For example, the reinforcement material may include discontinuous whiskers, platelets, fibers, or particulates. Additionally, or alternatively, the reinforcement material may include a continuous monofilament or multifilament two-dimensional or three-dimensional weave, braid, fabric, or the like. In some examples, the reinforcement material may include carbon (C), silicon carbide (SiC), silicon nitride ($Si_3N_4$), an aluminosilicate, silica ($SiO_2$), a transition metal carbide or silicide (e.g. WC, $Mo_2C$, TiC, $MoSi_2$, $NbSi_2$, $TiSi_2$), or the like.

Substrate 12 may be manufactured using one or more techniques including, for example, chemical vapor deposition (CVD), chemical vapor infiltration (CVI), polymer impregnation and pyrolysis (PIP), slurry infiltration, melt infiltration (MI), combinations thereof, or other techniques.

EBC system 14 may help protect underlying substrate 12 from chemical species present in the environment in which article 10 is used, such as, e.g., water vapor, calcia-magnesia-alumina-silicate (CMAS; a contaminant that may be present in intake gases of gas turbine engines), or the like. CMAS is the general name given to molten deposits formed due to ingestion of sand or other silaceous materials by high temperature mechanical systems, as the predominant oxides are Calcia (CaO), Magnesia (MgO), Alumina ($Al_2O_3$) and Silica ($SiO_2$). Additionally, in some examples, T/EBC system 14 may also protect substrate 12 and provide for other functions besides that of a T/EBC, e.g., by functioning as a thermal barrier coating (TBC), abradable coating, erosion resistant coating, and/or the like.

As illustrated in FIG. 1, optional bond coat 16 of coating system 14 is on substrate 12. As used herein, "formed on" and "on" mean a layer or coating that is formed on top of another layer or coating, and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent another layer or coating, e.g., there are no intermediate layers or coatings. In some examples, as shown in FIG. 1, bond coat 16 of coating system 14 may be directly on substrate 12. In other examples, one or more coatings or layers of coatings may be between coating 16 of coating system 14 and substrate 12.

Bond coat 16 may be between T/EBC layer 18 and substrate 12 and may increase the adhesion of T/EBC layer 18 to substrate 12. In some examples, bond coat 16 may include silicon metal (e.g., free elemental silicon not present as part of a compound) and take the form of a silicon bond layer. Bond coat 16 may be in direct contact with substrate 12 and T/EBC layer 18. In some examples, bond coat 16 has a thickness of approximately 25 microns to approximately 250 microns, although other thicknesses are contemplated.

In examples in which substrate 12 includes a ceramic or CMC, bond coat 16 may include a ceramic or another material that is compatible with the material from which substrate 12 is formed, alone or in addition to silicon metal. For example, bond coat 16 may include mullite (aluminum silicate, $Al_6Si_2O_{13}$), silicon alloy, silica, a silicide, or the like. Bond coat 16 may further include other elements, such as a rare earth silicate including a silicate of lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and/or scandium (Sc).

The composition of bond coat 16 may be selected based on the chemical composition and/or phase constitution of substrate 12 and the overlying layer (e.g., T/EBC layer 18 of FIG. 1). For example, if substrate 12 includes a ceramic or a CMC, bond coat 16 may include silicon metal or alloy or a ceramic, such as, for example, mullite.

In some cases, bond coat 16 may include multiple layers. For example, in some examples in which substrate 12 includes a CMC including silicon carbide, bond coat 16 may include a layer of silicon on substrate 12 and a layer of mullite, a rare earth silicate, or a mullite/rare earth silicate dual layer on the layer of silicon. In some examples, a bond coat 16 including multiple layers may provide multiple functions of bond coat 16, such as, for example, adhesion of substrate 12 to an overlying layer (e.g., T/EBC layer 18 of FIG. 1), chemical compatibility of bond coat 16 with each of substrate 12 and the overlying layer, a better coefficient of thermal expansion match of adjacent layers, or the like.

Bond coat 16 may be applied on substrate 12 using, for example, thermal spraying, e.g., air plasma spraying, high velocity oxy-fuel (HVOF) spraying, low vapor plasma spraying, suspension plasma spraying; physical vapor deposition (PVD), e.g., electron beam physical vapor deposition (EB-PVD), directed vapor deposition (DVD), cathodic arc deposition; chemical vapor deposition (CVD); slurry process deposition; sol-gel process deposition; electrophoretic deposition; or the like.

EBC system 14 includes T/EBC layer 18, which may be configured to help protect substrate 12 against deleterious environmental species, such as CMAS and/or water vapor. T/EBC layer 18 may be any suitable thickness. For example, T/EBC layer 18 may have a thickness of about 0.003 inches (about 75 micrometers) to about 0.100 inches (about 2540 micrometers). In examples in which layer 18 is a non-abradable layer, layer 18 may have a thickness of about 0.001 inches (about 25.4 micrometers) to about 0.005 inches (about 127 micrometers) or about 0.010 inches (about 254 micrometers). In other examples, layer 18 may have a different thickness.

As described herein, T/EBC layer 18 may include one or more silicate phases including more than one metal cation incorporated into the crystal lattice structure of the silicate phase(s). In some examples, each silicate phase of T/EBC layer 18 may incorporate multiple metal cations into the crystal lattice of the silicate phase. In examples in which T/EBC layer 18 includes multiple silicate phases, at least one of the silicate phases may include multiple metal cations (e.g., some but not all of the silicate phases include multiple metal cations or all of the silicate phases include multiple metal cations).

The silicate phase may be a monosilicate phase and/or disilicate phase. The crystal lattice structure of monosilicate and disilicate are typically monoclinic, with exceptions of some disilicate polymorphs. The monosilicates can be seen to have either a space group type of P2 1/c or C2/c. These phases are termed X-1 and X-2, respectively. The X-1 phase is dominant for rare earth elements lutetium through europium on the periodic table, and can also be seen as a low temperature polymorph for the other rare earth monosilicates. It should be noted that not all X-2 monosilicates display this low temperature polymorph. For both X-1 and X-2 monosilicate structures, the rare earth cations occupy two distinct sites, with a total of four cations per unit cell. Rare earth cations bond most strongly with oxygen atom(s), and are arranged around silicon-oxygen tetrahedra in the lattice. Entropy stabilization with a five-cation system, e.g., may occur when each rare earth cation site on the lattice is randomly occupied by one of the five cations, and hence disordered. The disilicate systems can show up to seven polymorphs over a wide range of temperatures. Compound properties are known to vary greatly between disilicate polymorphs. As will be described in further detail below, T/EBC layer 18 may be formed from a mixture of, e.g., rare earth silicates, transition metal silicates, and/or alkaline earth silicates. The mixture of the multiple silicate system may achieve configurational disorder that produces one or more silicate phases that each incorporate all the elements (no silicate phase that contains only one cation).

Example metal cations that may be incorporates into the silicate phase(s) may include rare earth metals, transition metals, and/or alkaline earth metals. Rare earth metals include lutetium (Lu), ytterbium (Yb), thulium (Tm), erbium (Er), holmium (Ho), dysprosium (Dy), gadolinium (Gd), terbium (Tb), europium (Eu), samarium (Sm), promethium (Pm), neodymium (Nd), praseodymium (Pr), cerium (Ce), lanthanum (La), yttrium (Y), and scandium (Sc). Transition metals include metals in group 3 to group 12 of the periodic table. Alkaline earth metals include beryllium (Be), magnesium (Mg), calcium (Ca), strontium (Sr), barium (Ba), and radium (Ra).

In some examples, T/EBC layer 18 may include only a single silicate phase, where to the single silicate phase includes two or more metal cations in the crystal lattice structure of the single silicate phase. The single silicate phase may be a monosilicate or disilicate phase. The number of metal cations in the crystal lattice structure may be two or more than two, such as three, four, five or more than five metal cations. In some examples, thermal conductivity of T/EBC layer 18 may decrease with increasing number of cations. In some examples, there may be a reduction in thermal conductivity in entropy stabilized oxides where the thermal conductivity continues to decrease up to the inclusion of, e.g., six metal cations and may plateau at some number of cations.

In some examples, the multiple metal cations may all be rare earth metal cations, may all be transition metal cations, may all be alkaline earth metal cations, or some combination of rare earth metal cations, transition metal cations, and/or alkaline earth metal cations.

As another example, T/EBC layer 18 may include multiple silicates phases, where each silicate phase includes multiple cations incorporated into the crystal lattice structure of the silicate phase. The multiple silicate phases may all be monosilicate phases, all disilicate phases, or some combination of monosilicate and disilicate phases. Each of the multiple phases may include the same metal cations in the crystal lattice structure, different metal cations in the crystal lattice structure, or some combination of the same and different metal cations in the crystal lattice structure. For example, in a system including a first silicate phase and a second silicate phase, the first silicate phase may each be monosilicates, may each be disilicates, or one may be a disilicate and the other may be monosilicate. The first silicate phase may incorporate metal cations "X" and "Y" and the second silicate phase may include metal cations "X" and "Y," may include metal cations "X" and "Z" or may include metal cations "Z" and "A". In the described example, metal cations X, Y, Z, and A do not refer to specific metal cations but only denote different metal cations.

The different metal cations may be present in each phase in any suitable ratio. In some examples, for a silicate phase including only a first metal cation and a second metal cation incorporated into the crystal lattice structure, the first and second metal cations may be present in approximately a 1:1 molar ratio. In other examples, the silicate phase may include more of the first metal cation than the second metal cation or vice versa. In a silicate phase include first, second, and third metal cations, the first, second, and third cations may be present in approximately equal or equal amounts, different amounts, or first and second cations in approximately equal or equal amounts with the third cation being present in a greater or lesser amount that the first and second cation.

In some examples, T/EBC layer 18 may consist or consist essentially of a single silicate phase, where the silicate phase includes multiple metal cations. In another example, T/EBC layer 18 may consist or consist essentially of more than one silicate phase. Each silicate phase may include multiple metal cations or at least one silicate phase may include multiple metal cations (e.g., where some but not all of the multiple silicate phases includes only one metal cation). In some examples, T/EBC layer 18 may include, consist, or consist essentially of e a two phase or multi-phase mixture of monosilicates and disilicates (e.g., rare earth monosilicate and rare disilicate), where each phase includes multiple cations.

In other examples, T/EBC layer 18 may include one or more non-silicate phases. For example, T/EBC layer 18 may include relatively small amounts (e.g., less than about 5 volume % or less than about 3 volume %) of rare earth oxide $RE_2O_3$, the presence of which may depend, e.g., on the purity of the monosilicate powders as-received/used as starting materials to form T/EBC layer 18. In cases in which one or more non-silicate phases are present, those phases may be present in an amount of less than about 10 vol %, such as, e.g., less than about 5 vol %, e.g., due to processing capabilities. However, in some examples, it is preferable to maximize the amount of silicate phase in T/EBC layer 18

In some examples, one or more properties of T/EBC layer 18 may be tailored or otherwise modified by incorporating multiple metal cations into the crystal lattice structure of the silicate phase(s) of T/EBC layer 18, e.g., as compared to a T/EBC layer that includes one or more silicate phases each including only a single metal cation in the crystal structure of the respective silicate phase(s). Example properties may include the thermal conductivity of T/EBC layer 18, the coefficient of thermal expansion of T/EBC layer 18, the water vapor stability of T/EBC layer 18, and/or stability of T/EBC layer 18 to one or more other environmental factors (e.g., CMAS resistance or hot corrosion resistance. Tailoring of such properties may be achieved, e.g., by achieved by selecting the appropriate silicates and processing them together to form T/EBC layer 18 with a composition such as that described herein.

For example, by incorporating more than one metal cation into at least one of the silicate phase(s) of T/EBC layer 18, the thermal conductivity of T/EBC layer 18 may be modified, e.g., decreased or increased, as compared to a T/EBC layer including the same silicate phase(s) but with only one metal cation in each of the silicate phase(s). In some examples, it may be preferred that T/EBC layer 18 exhibits a relatively low thermal conductivity, e.g., to provide thermal protection to substrate 12 and/or the other layers underlying T/EBC layer 18 during operation of article 10 in a high temperature environment. The incorporation of multiple metal cations into the silicate phase(s) of T/EBC layer 18 may allow for the thermal conductivity of T/EBC layer 18 to be tailored or otherwise modified such that T/EBC layer 18 exhibits a desired level of thermal conductivity. In some examples, T/EBC layer 18 may have a thermal conductivity of less than approximately 1 W/m K, or a thermal conductivity of approximately 0.5 W/m K to approximately 1 W/m K. In some examples, a thermal conductivity value of 0.9 W/m K may be achievable in a very dense article. The coating process used to form T/EBC layer 18 may assist in tailoring the thermal conductivity. In some examples, the thermal conductivity may be even lower, e.g., as low as about 0.1 to about 0.3 W/m K (e.g., where the local charge disorder induces a change in the interatomic force constants, offering additional phonon scattering mechanisms driving the thermal conductivity down). In some entropy stabilized oxides, as a comparison, the thermal conductivity of some of the constituent metal oxides (MgO as an example k=about 60 W/m/K) are over an order of magnitude higher than the end result of the multicomponent metal oxide.

In some examples, local ionic charge disorder is the mechanism by which the large reduction in thermal conductivity may be achieved, e.g., similar to that of entropy stabilized oxides (ESOs). Even for the same average mass, adding in one additional cation may cause approximately a 2 time reduction in thermal conductivity that cannot be accounted for by mass disorder or changes in elastic properties (i.e. phonon velocities). In some examples, the local strain in the crystalline lattice causes a larger than expected reduction in the thermal conductivity on the order of what might be expected from a fully amorphous system (i.e. energy carriers scatter every atomic spacing).

As another example, by incorporating more than one metal cation into at least one of the silicate phase(s) of T/EBC layer 18, the coefficient of thermal expansion of T/EBC layer 18 may be modified, e.g., decreased or increased, as compared to a T/EBC layer including the same silicate phase(s) but with only one metal cation in each of those phase(s). In some examples, it may be preferred that T/EBC layer 18 exhibits a relatively low coefficient of thermal expansion, e.g., to provide for a coefficient of thermal expansion similar to that of substrate 12 and/or the other layers underlying T/EBC layer 18 during operation of article 10 in a high temperature environment. Such matching of thermal expansion between T/EBC layer 18 and the other layers of article 10 may provide, e.g., for better layer adhesion, better thermal shock resistance, and/or better crack mitigation. In some examples, tailoring of the coefficient of thermal expansion may help in managing thermal stresses. If the thermal stresses exceed the adhesion, then cracking may occur. The larger coefficient of thermal expansion difference between the CMC or other substrate and the T/EBC layer, the higher the probability.

The incorporation of multiple metal cations into the silicate phase(s) of T/EBC layer 18 may allow for the coefficient of thermal expansion of T/EBC layer 18 to be tailored or otherwise modified such that T/EBC layer 18 exhibits a desired adhesion to bond layer 16 and/or substrate 12. In some examples, T/EBC layer 18 may have a coefficient of thermal expansion of approximately $4.5\times10(-6)°$ C.-1 to approximately $8\times10(-6)°$ C.-1. In some examples, it may be preferred to keep the coefficient of thermal expansion between about 4 and about 8 ppm/° C. A value greater than 8 ppm/° C. may result in a high stress. In some examples, if the T/EBC layer has a value, e.g., of 8 ppm/° C., then a low conductivity may be desired in order to allow for reduced coating thickness.

In some examples, thermal expansion can be modified by a multiple cation monosilicate. Thermal expansion may be predicted to follow a rule of mixtures, but may be tailored based off of cation mass or ionic radius. In some examples, monosilicate coefficient of thermal expansions (CTEs) are anisotropic in nature. The CTE along the a, b, and c directions of the unit cell can vary by almost an order of magnitude. In some example, cation additions may possibly be tailored to decrease the anisotropy in thermal expansion.

As another example, by incorporating more than one metal cation into at least one of the silicate phase(s) of T/EBC layer 18, the water vapor stability of T/EBC layer 18 may be modified, e.g., decreased or increased, as compared to a T/EBC layer including the same silicate phase(s) but with only one metal cation in each of those phase(s). In some examples, rare earth monosilicates are more resistant in a water vapor environment than their disilicate counterparts.

In some examples, T/EBC layer 18 may include a mixture of monosilicate and disilicate phases, with each phase including multiple cations. For example, mixture of monosilicate and disilicate phases, with each phase including multiple cations, may be used for stabilization of the crystal structure. Some of the monosilicates have relatively low CTE at temperatures less than 1200 C but then go through a polymorphic phase transition that results in a higher CTE (e.g., yttrium monosilicate). A mixture of monosilicate and disilicate phases, with each phase including multiple cations, may aid in avoiding the phase transition.

As another example, by incorporating more than one metal cation into at least one of the silicate phase(s) of T/EBC layer 18, the CMAS resistance of T/EBC layer 18 may be modified, e.g., decreased or increased, as compared to a T/EBC layer including the same silicate phase(s) but with only one metal cation in each of those phase(s). CMAS reactivity with rare earth silicates may be dependent on the phase (e.g., more likely to form Ca-apatite with rare earth monosilicates than rare earth disilicates), and the rare earth cation size (rather than mass, although mass and size are correlated). For example, silicates with smaller rare earth cations may be less likely to react with CMAS to form the Ca-apatite phase.

As another example, by incorporating more than one metal cation into at least one of the silicate phase(s) of T/EBC layer 18, the hot corrosion resistance of T/EBC layer 18 may be modified, e.g., decreased or increased, as compared to a T/EBC layer including the same silicate phase(s) but with only one metal cation in those phase(s). Hot corrosion resistance may be dependent on phase (e.g., with disilicates being more reactive than monosilicates) and rare earth cation size (e.g., smaller rare earth cations may be less likely to form Na-apatite.

Figure 1B:
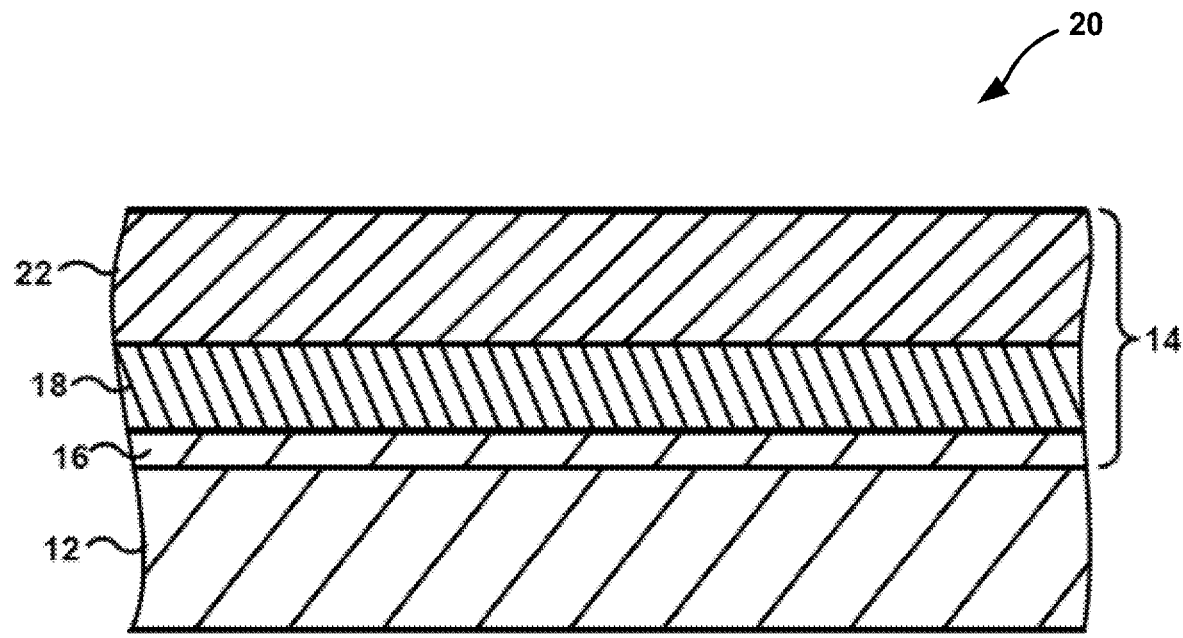

FIG. 1B is a conceptual diagram illustrating another example article 20 including a substrate 12 and a T/EBC coating system 14. T/EBC coating system 14 and substrate 12 may be the same or substantially similar to that of T/EBC coating system 14 and substrate 12 of FIG. 1A and are similarly numbered.

However, unlike that of article 10 shown in FIG. 1A, coating system 14 includes abradable layer 22 on T/EBC layer 18. In such a configuration, coating system 14 may be configured such that abradable layer 22 has a greater porosity than T/EBC layer 18, and the porosity of abradable layer 22 may be provided such that the outer surface of abradable layer 22 is abraded, e.g., when brought into contact with an opposing surface such as a blade tip. Abradable layer 22 may be on T/EBC layer 18, which may provide for better adhesion of abradable layer 22 to optional bond layer 16 or substrate 12. In some examples, abradable layer 22 may define a thickness between about 0.005 inches (about 127 micrometers) and about 0.100 inches (about 2540 micrometers). In other examples, layer 22 may have a different thickness.

The composition of abradable layer 22 may be the same or substantially similar to that of T/EBC layer 18. As described above for T/EBC layer 18, abradable layer 22 may include one or more silicate phases (e.g., disilicate and/or monosilicate phase(s)), where some or all of the silicate phases include more than one metal cation incorporated into the crystal lattice structure of the silicate phase. Example metal cations that may be incorporates into the silicate phase(s) may include rare earth metals, transition metals, and/or alkaline earth metals.

EBC layer 18 and abradable layer 22 may have a porous microstructure or a columnar microstructure. A porous microstructure may include a plurality of pores (e.g., voids) within the layer material, and a columnar microstructure may include columns of the layer material extending from the surface of a substrate (or another coating layer) with elongated intercolumnar voids. A porous or a columnar microstructure may improve the in-plane strain tolerance and/or the thermal cycle resistance of layers 18 and 22. In some examples, an average minimum dimension of the voids, such as, for example, an average minimum diameter of a pore of a porous microstructure, may be about 0.1 micrometers (μm) to about 20 μm.

In examples in which layers 18 and 22 have a porous microstructure, layer 18 or layer 22 may include a porosity of more than about 10 vol. %, such as more than about 20 vol. %, more than 30 vol. %, or more than about 40 vol. %, where porosity is measured as a percentage of pore volume divided by total volume of coating 16. When configured as a non-abradable layer, T/EBC layer 18 may include a porosity of more than about 1 vol. %, such as more than about 2 vol. %, more than 3 vol. %, or about 5 vol. % to about 10 vol. %, where porosity is measured as a percentage of pore volume divided by total volume of T/EBC layer 18. In some examples, layers 18 and/or 22 may be substantially dense with a porosity of 5 vol % or less. When configured as an abradable layer, abradable layer 22 may include a porosity of more than about 15 vol. %, such as more than about 25 vol. %, more than 35 vol. %, or about 25 vol. % to about 45 vol. %, where porosity is measured as a percentage of pore volume divided by total volume of abradable layer 22. In each case, the porosity of layers 18 and 22 may be measured using mercury porosimetry, optical microscopy or Archimedean method.

In some examples, the porosity of T/EBC layer 18 and abradable layer 22 may be created and/or controlled by plasma spraying the coating material using a co-spray process technique in which the coating material and a coating material additive are fed into a plasma stream with two radial powder feed injection ports. The feed pressures and flow rates of the coating material and coating material additive may be adjusted to inject the material on the outer edge of the plasma plume using direct 90-degree angle injection. This may permit the coating material particles to soften but not completely melt, and the coating material additive to not burn off, but rather soften sufficiently for adherence within coating 16.

In other examples, the porosity of T/EBC layer 18 and abradable layer 22 may be controlled by the use of coating material additives and/or processing techniques to create the desired porosity. For example, to form abradable layer 22 of coating 14 in FIG. 2, a fugitive material that melts or burns at the use temperatures of the component (e.g., a blade track) may be incorporated into the coating material that forms abradable layer 22. The fugitive material may include, for example, graphite, hexagonal boron nitride, or a polymer such as a polyester, and may be incorporated into the coating material prior to deposition of the coating material on substrate 12 to form abradable layer 22. The fugitive material then may be melted or burned off in a post-formation heat treatment, or during operation of the gas turbine engine, to form pores in coating 16. The post-deposition heat-treatment may be performed at up to about 1500° C. for a component having a substrate 12 that includes a CMC or other ceramic. As will be described in further detail herein, in some example, a nucleating agent may be incorporated with the fugitive material during the application process such that the nucleating agent is left within the pores formed by burning out or otherwise removing the fugitive material from the abradable layer 22.

In other examples, the porosity of coating 16 may be created or controlled in a different manner, and/or coating 16 may be deposited on substrate 12 using a different technique. For example, coating 16 may be deposited using a wide variety of coating techniques, including, for example, a thermal spraying technique such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, or combinations thereof In some examples in which T/EBC layer 18 or abradable layer 22 has a columnar microstructure, layer 18 or layer 22 may be deposited on substrate 12 using a suspension plasma spray technique, an EB-PVD technique, a plasma spray physical vapor deposition (PSPVD) technique, or a directed vapor deposition (DVD) technique. In some examples, layer 18 or layer 22 including a columnar microstructure may include a dense vertically cracked (DVC) coating, which in some cases, may be deposited on substrate 12 using an air plasma spray technique.

Figure 2:
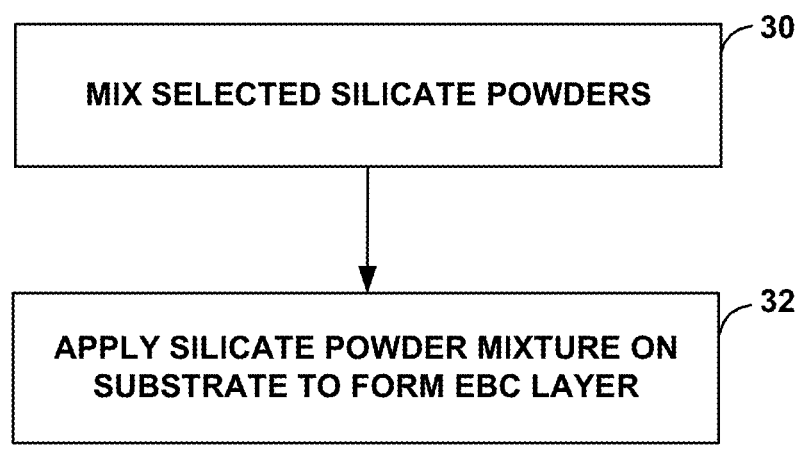
FIG. 2 is a flow diagram illustrating an example technique of forming an article including a substrate and T/EBC system in accordance with the disclosure.

FIG. 2 is a flow diagram illustrating an example technique of forming an article including a substrate and a T/EBC coating system. The technique of FIG. 2 will be described with respect to article 10 of FIG. 1A. As described above, However, in other examples, the technique of FIG. 2 may be used to form articles other than article 10 of FIG. 1A.

The technique of FIG. 2 includes mixing selected silicate powders with each other (30). The selected silicate powders may be monosilicate and/or disilicate powders, where each silicate powder is a silicate with a single cation of the desired final product for T/EBC layer 18 with more than one cation incorporated into the crystal lattice of the silicate phase. For example, the silicate powders that are mixed with each other may include rare earth metal, transition metal, and/or alkaline earth metal silicate powders. In one example, the silicate powders may all be rare earth monosilicates such as $Yb_2SiO_5$, $Dy_2SiO_5$, $Er_2SiO_5$, $Y_2SiO_5$, and $Sc_2SiO_5$ powders as described below. For example, starting with powders of single rare earth cation, those starting powders may be mixed to form one or more silicate phases with any ratio and number of multiple rare earth cations The amount of each silicate powder in the starting components may be present in any suitable amount to provide for a desired silicate phase composition of T/EBC layer 18 such as the composition of T/EBC layer 18 described above. In some examples, each of the silicate powders mixed with each may be present in an approximately 1:1 molar ratio (e.g., a substantially equimolar ratio of the silicate powders.

The mixing of the powder may be carried out using any suitable technique. In some example, the mixing process may include high energy ball milling or other mechanical mixing technique. As another example, liquid precursor processing, such as liquid precursor processing used for individual rare silicates, may be used. For example, liquid precursors like nitrates may be used as starting materials and mixed in the liquid state, then dried/heat treated to form mixed powders. In the case of a precursor for a plasma spray process, the individual powder could be mixed together using spray drying methods.

The mixed silicate powders may then be applied directly on substrate 12 or indirectly (e.g., by first applying optional bond coat 16 on substrate 12 followed by the application of T/EBC layer 18 onto bond coat 16, as shown in FIG. 1) to form T/EBC layer 18 (32). T/EBC layer 18 may be applied on substrate 12 using any one or more of a wide variety of coating techniques, including, for example, thermal spraying such as plasma spraying or suspension plasma spraying, physical vapor deposition (PVD) such as EB-PVD (electron beam physical vapor deposition) or DVD (directed vapor deposition), cathodic arc deposition, slurry process deposition, sol-gel process deposition, plasma spray physical vapor deposition (PSPVD), air plasma spraying, or combinations thereof. In some examples, the mixture of powders may be deposited on substrate 12 to form a layer and then quenched to form a single silicate phase with multiple metal cations or a plurality of silicate phases each with multiple cations, where the number of silicate phases is less than the number of starting silicate powder phases.

Prior to mixing, the respective silicate powers may each define a distinct silicate phase, with each silicate only including a single cation. After mixing and application onto substrate 12 to form T/EBC layer 18, the powders may form a single silicate phase including more than one cation (e.g., the single silicate phase may include the cation of each of the distinct silicate powder phases) or multiple silicate phases each including multiple cations (e.g., each of the silicate phases may include the cation of each of the distinct silicate powder phases or at least multiple cations from the distinct silicate powder phases). In the case of the multiple silicate phases, the number of silicate phases of T/EBC layer 18 may be less than the number of distinct powder phases in the original mixture. For example, if five silicate powders are mixed and applied to substrate 12, T/EBC layer 18 may include less than five silicate phases, with each phase including five different cations from the five different silicate powders.

While the example technique of FIG. 2 is described as including a separate step for mixing the silicate powders prior to application of the mixture on substrate 12, in other examples, the application process may include thermal spraying or other techniques in which the powders are additionally or alternatively mixed upon contact with the substrate. In some thermal spraying techniques, the powders may be initially mixed with each other before thermal spraying and then further mixed with each other upon contact with the substrate. In some examples, slurry based or liquid mixing processes may also be used to form T/EBC layer 18, and may include mixing of the powder prior to application on the substrate. In some examples, a fusing process may be employed that melts and mixes the silicates prior to coating. After fusing, the melt may be crushed to the particle size desired for application to the substrate.

EXAMPLES

As series of tests were performed to evaluate one or more aspects of some examples of the disclosure. However, the disclosure is not limited by the tests.

Two rare earth monosilicate mixtures (referred to as "Mixture 1" and "Mixture 2") were formed and then evaluated to determine the feasibility of producing a single-phase coating system. While the tests were carried out with monosilicates, it is believed that the approach could be extended to other monosilicates, rare earth disilicates and/or other disilicates.

Each of the mixture was formed from multiple rare earth monosilicates in powder form as starting materials. Mixture 1 was formed from a mixture of $Yb_2SiO_5$, $Dy_2SiO_5$, $Nd_2SiO_5$, $Y_2SiO_5$, and $Sc_2SiO_5$ powders. Mixture 2 was formed from a mixture of $Yb_2SiO_5$, $Dy_2SiO_5$, $Er_2SiO_5$, $Y_2SiO_5$, and $Sc_2SiO_5$ powders. In each case, equimolar amounts of the powders were blended together by ball milling for 24 hours and then hot pressed at 1500 degrees Celsius for 30 minutes in a spark plasma sintering unit. Sintering of the mixture was performed in a reducing environment of argon. This was followed by a 24-hour heat treatment at 1500 degrees Celsius in air to restore oxygen stoichiometry. After the initial processing, it was determined that Mixture 1 resulted in the formation of at least two compounds that were confirmed by scanning electron microscopy (SEM).

Figure 3:
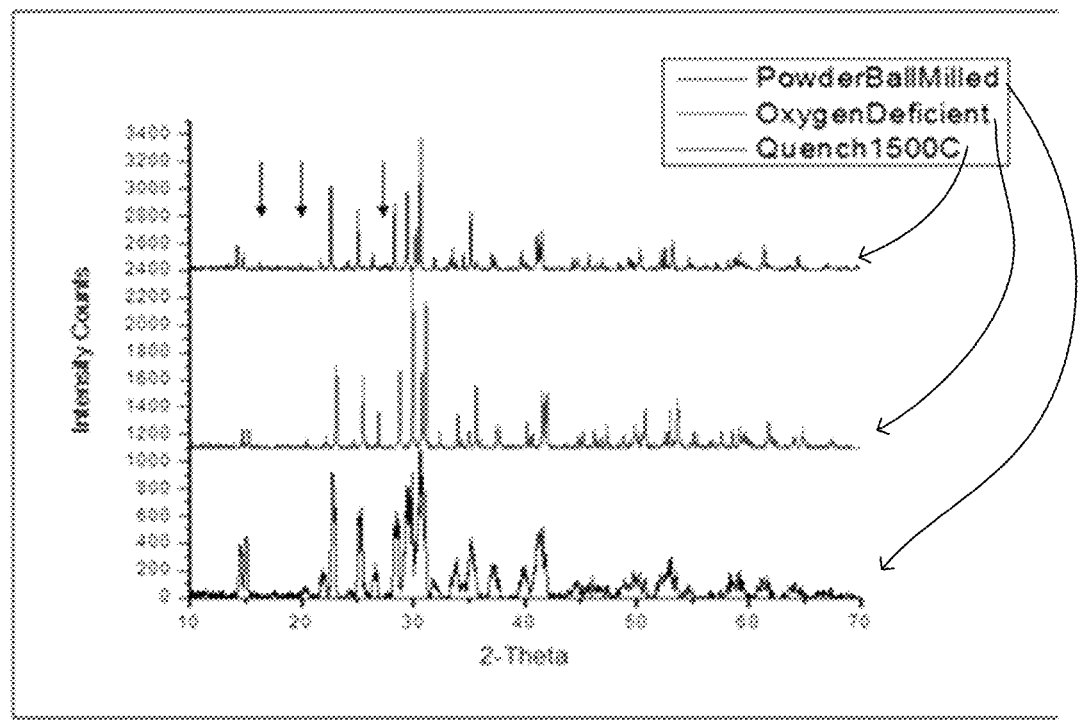
FIGS. 3-24 are various images and plots relating to experiments carried out to evaluate aspects of this disclosure.

FIG. 3 illustrates the X-ray diffraction patterns for the starting powder and processed material for Mixture 2. The x-ray diffraction results were obtained after different steps in the processing. PowderBallMilled corresponds to the powder material after mixing before heat treatment. Quenched1500C corresponds to the material that was cooled rapidly from 1500 degrees Celsius during the heat treatment to restore oxygen stoichiometry. OxygenDeficient corresponds to the material after completion of the spark plasma sintering in argon.

The X-ray diffraction of the ball milled powder mixture 2 showed broad diffraction peaks in the due to peak overlap caused by the five discreet phases of the five different monosilicate starting powders. The X-ray diffraction for the oxygen deficient sample refers to the bulk sample state after sintering in the spark plasma sintering unit in a reducing environment. The X-ray diffraction for the processed material after heat treatment in air (Quench1500C) showed reduced broadening of the peaks suggesting that the number of phases was reduced from the starting mixture. All but three peaks in the Quench 1500C pattern could be matched to either $Er_2SiO_5$ or $Y_2SiO_5$. The peaks marked with an arrow in FIG. 3 matched the pattern for $Y_2Si_2O_7$.

Figure 4:
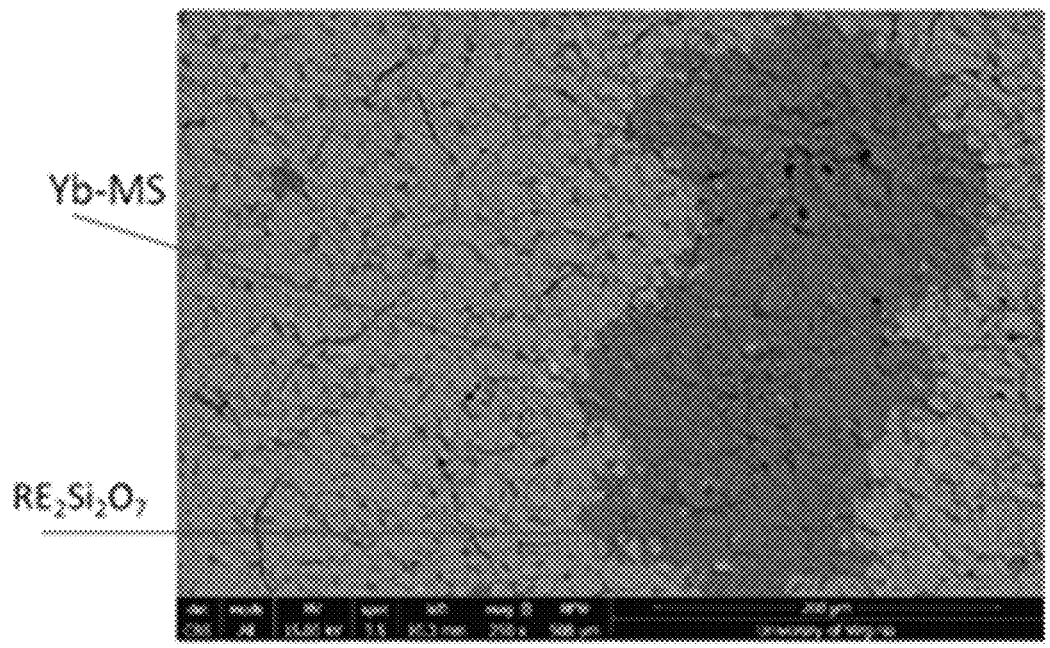

Cross-sectional analysis of processed Mixture 2 involved mounting the sample in epoxy and polishing the surface to 1 micron with diamond suspension, followed by a final polish with 0.05 micron colloidal silica. Scanning electron microscopy (SEM) revealed that multiple phases were present in the final material. FIG. 4 is a SEM image showing larger regions of rare earth disilicates ($RE_2Si_2O_7$) and ytterbium monosilicate (Yb-MS) regions.

Figure 5:
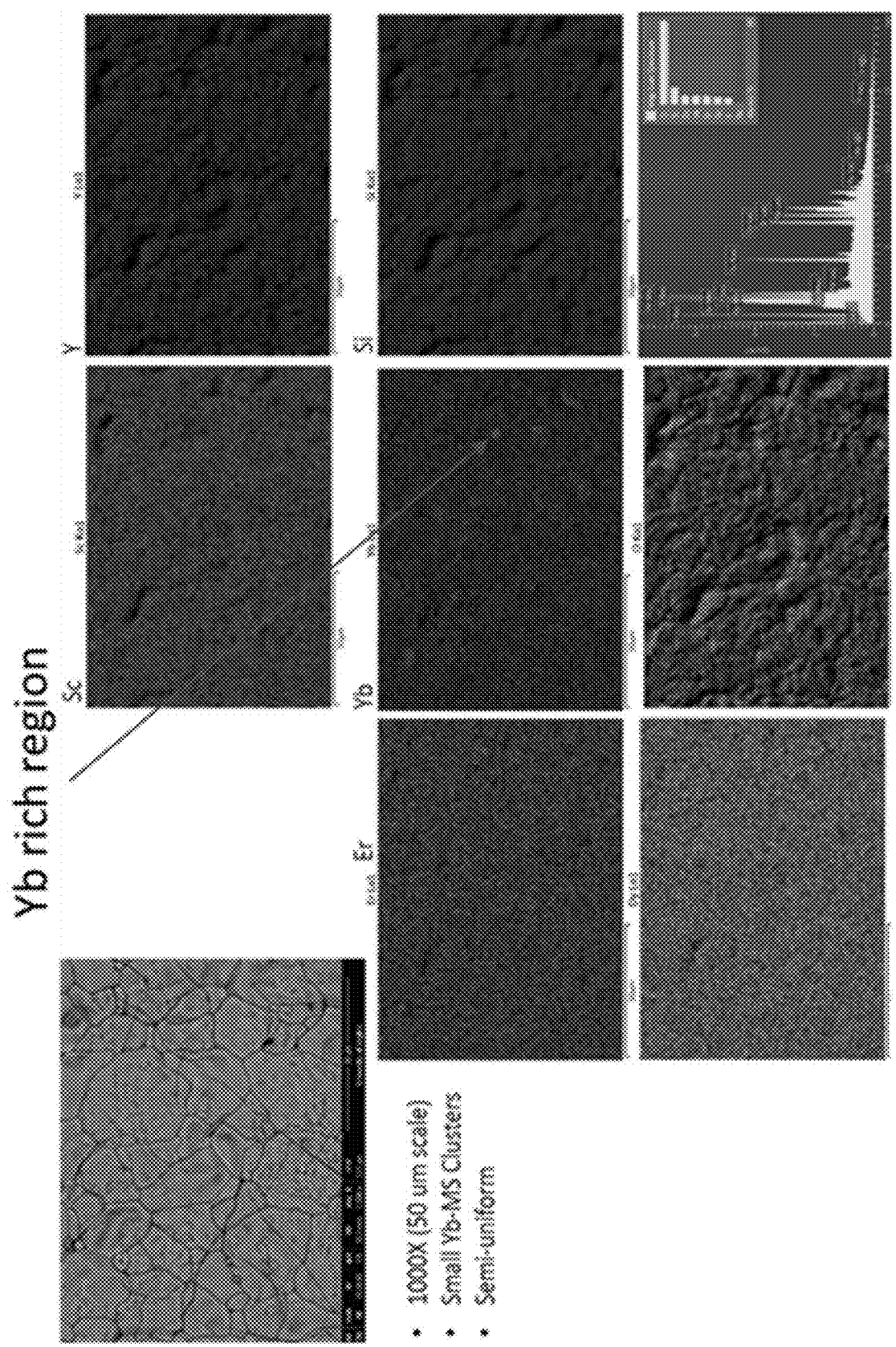

FIG. 5 is a series of Energy Dispersive Spectroscopy (EDS) element concentration maps for a high magnification SEM image, seen in the top left of the figure. Each colored EDS map represents a single cation element concentration over the region of the SEM micrograph (Top Left FIG. 5). The ytterbium EDS map (Blue) shows small regions of higher concentration. This refers to incomplete mixing of ytterbium in the solid solution, which could be caused by the angular morphology of the starting $Yb_2SiO_5$ powder. The images showed the presence of finer Yb rich regions (labelled "Yb rich region").

Figure 6:
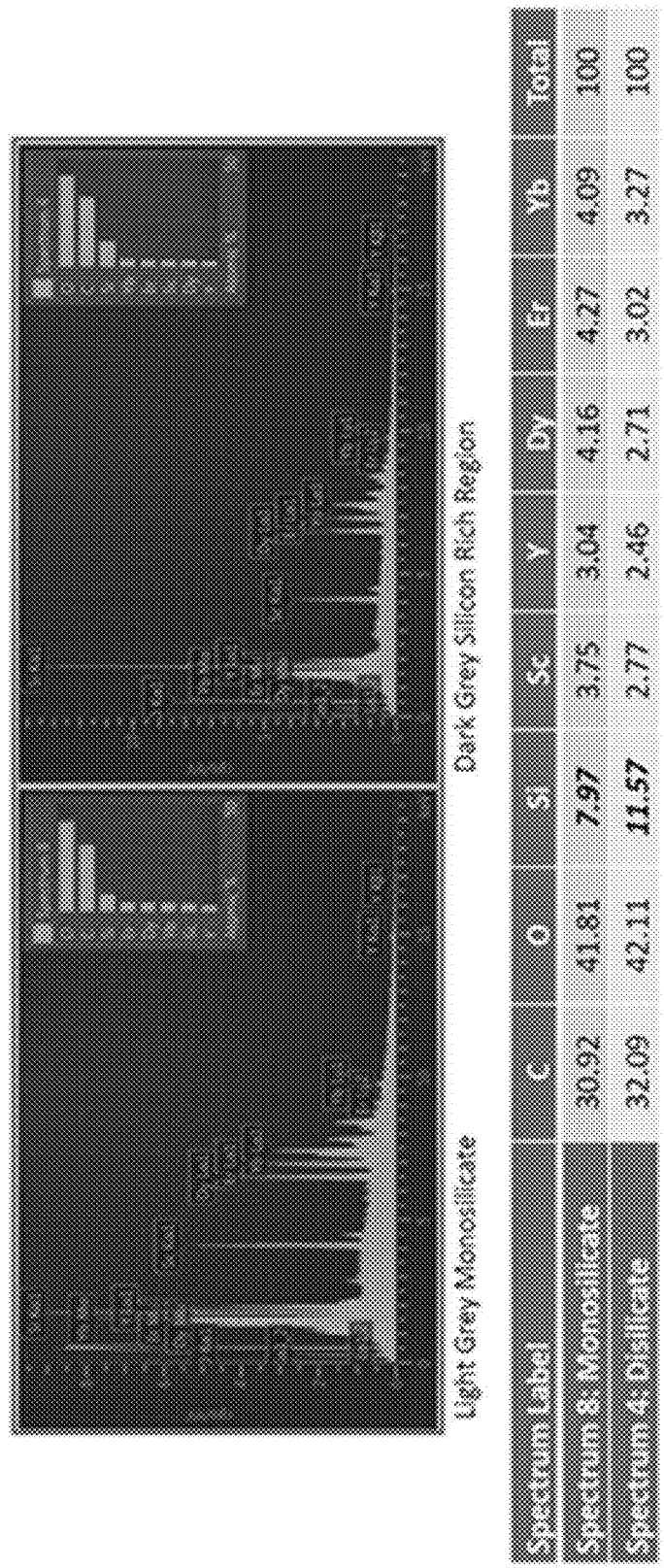
Figure 7:
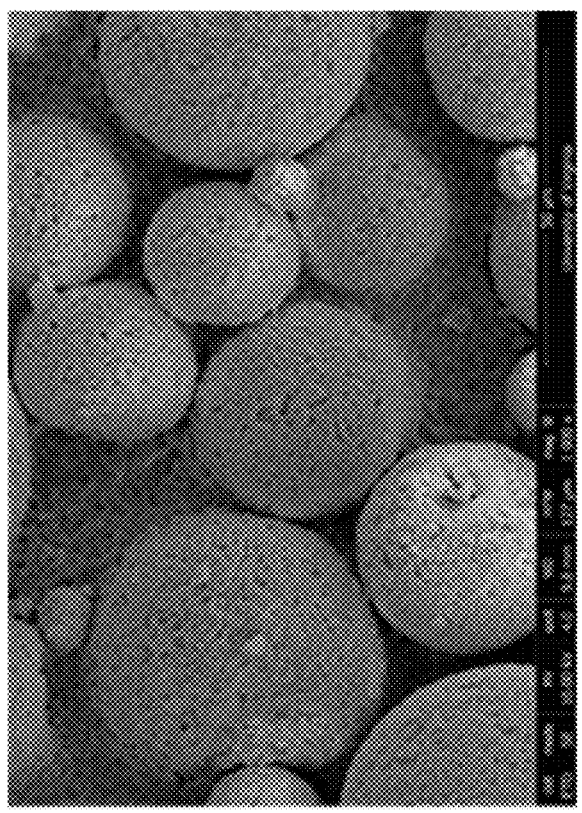
Figure 7:
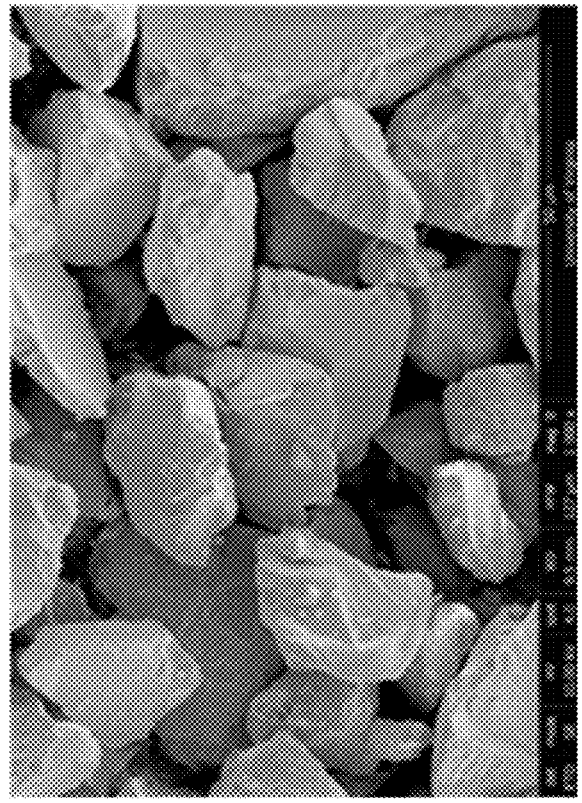

FIG. 6 are images from Energy Dispersive X-ray Spectroscopy (EDS) analysis of Mixture 2. The monosilicate (upper left image) and disilicate (upper right image) phases show the incorporation of all elements in relatively even dispersion. It was hypothesized that these additional phases could be a result of the starting morphology of the $Yb_2SiO_5$ powder, which did not promote homogenous mixing. FIG. 7 shows a comparison of the $Yb_2SiO_5$ (left image) and $Sc_2SiO_5$ (right image) powders that were produced via fused and crushed process and spray drying, respectively. It was hypothesized that removal of the $Yb_2SiO_5$ or transition to different powder morphology for the $Yb_2SiO_5$ would promote better mixing and may resolve the additional phase observed in Mixture 2.

Figure 8:
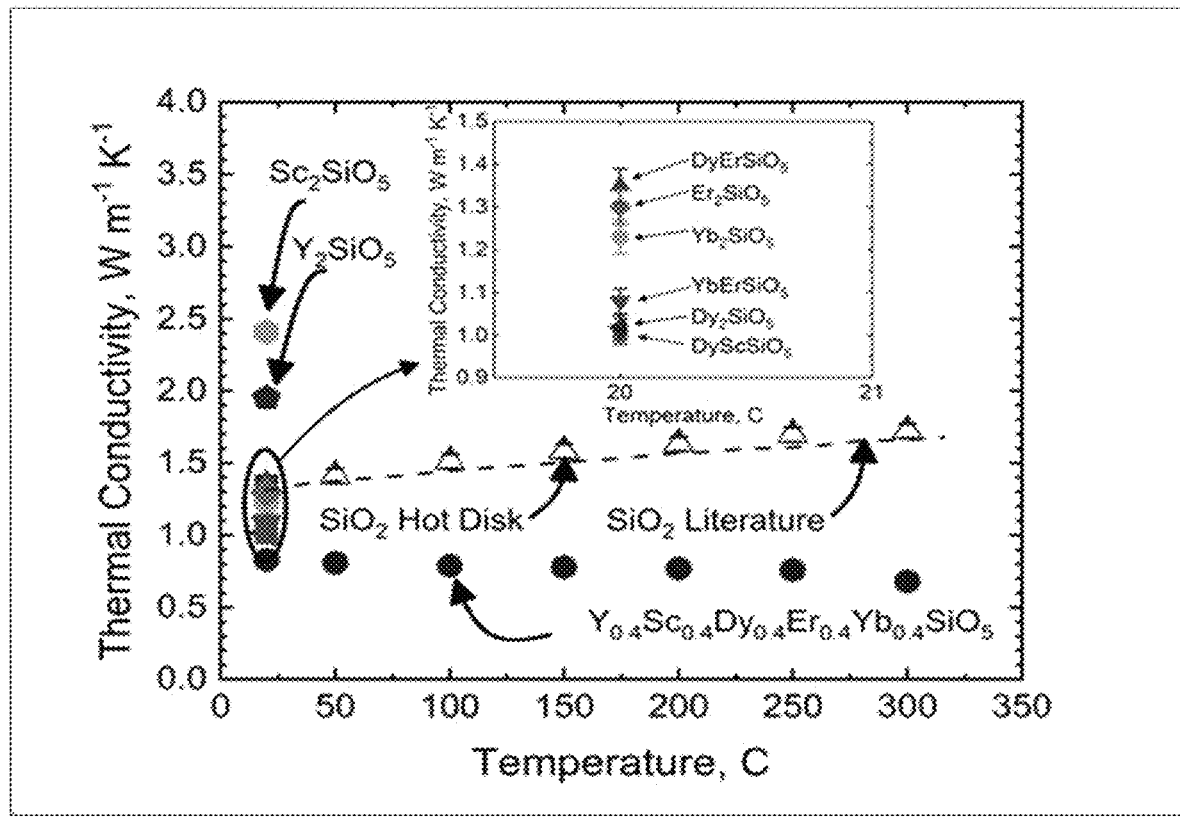

FIG. 8 provides a thermal conductivity plot of Mixture 2 in addition to the thermal conductivity for various single and multi-cation monosilicate and disilicates including $Yb_2SiO_5$, $Dy_2SiO_5$, $Er_2SiO_5$, $Y_2SiO_5$, and $Sc_2SiO_5$, and $SiO_2$ (hot disk and literature reported). Hot disk refers to a transient plane source method for measuring thermal conductivity and diffusivity of a bulk material. To measure the thermal conductivity for each sample, a conductive sensor was placed on the sample, and was used to measure changes in resistance compared to known resistance of the standalone sensor. The sensor can be heated via current pulses, which allows for measuring resistance changes with temperature. The geometry of the sensor and changes in signal output can be used to calculate thermal conductivity and thermal diffusivity for the sample.

The plot in FIG. 8 shows the ability of this approach to reduce conductivity when compared to the individual silicates. If the silicate phases in Mixture 2 would have formed multiple silicate phases that only contained single rare earth element the conductivity would have been higher.

Assuming a goal of entropy stabilization, then formation of a single phase (rather than compound) mixture is a step in the correct direction. In order to best characterize properties of a five cation mixture, a single phase should be present. Also, the concept of entropy stabilization is the idea that a complete solid solution is stabilized. Having multiple compounds/phases in the final mixture does not provide a single solid solution.

As outlined above, Mixture 2 had small regions where a single cation remained clustered, and was not evenly mixed. The size of these regions was small enough to be ignored for initial study described above. It was believed that appropriate powder mixing and processing techniques can be tuned to best limit these small segregated regions.

In another instance, testing was completed to evaluate the tailoring of the thermal conductivity and thermal expansion of rare earth monosilicates through the introduction of multiple rare earth cations in solid solution. As will be described below, six rare earth monosilicates were studied: $Sc_2SiO_5$, $Y_2SiO_5$, $Nd_2SiO_5$, $Dy_2SiO_5$, $Er_2SiO_5$, and $Yb_2SiO_5$. Four equimolar binary cation mixtures and a high entropy five-cation equimolar mixture were characterized.

Thermal expansion was measured up to 1200° C. with X-Ray Diffraction (XRD) and bulk thermal conductivity was measured by Hot Disk technique. The linear coefficient of thermal expansion (CTE) of mixed-cation systems followed a rule of mixtures, with average linear CTE between 6-9×10$^{-6}$/° C. Scandium monosilicate showed a lower linear CTE value as well as a notably lower degree of CTE anisotropy than other rare earth monosilicates. Thermal conductivity was found to decrease below rule of mixtures values through increasing heterogeneity in rare earth cation mass and ionic radii, as expected for the thermal conductivity of solid-solutions. The high entropy mixture RE$_2$SiO$_5$ (RE=Sc, Y, Dy, Er, and Yb) showed a thermal conductivity of 1.06 W/mK at room temperature, demonstrating that high entropy rare earth silicates are strong candidates for dual-purpose thermal and environmental barrier coatings.

Figure 9:
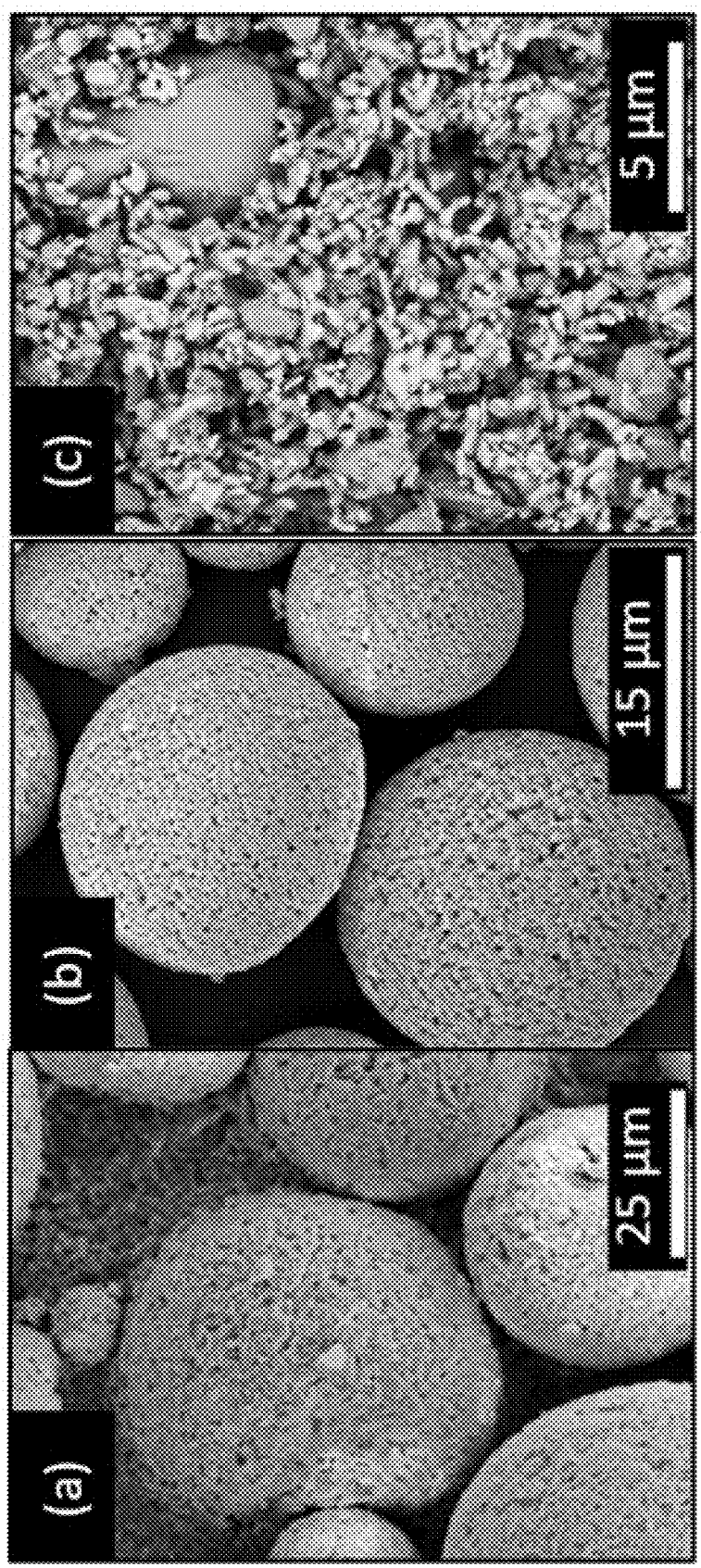

Sample Preparation:

Mixed RE$_2$SiO$_5$ were made by mixing equimolar ratios of pre-reacted single cation monosilicates (Praxair, United States). Starting Nd$_2$SiO$_5$ powder had an average diameter of 0.8 p.m. All other initial powders were obtained as spray granules composed of 1 micron to sub-micron particles as shown FIGS. 9a-9c. Fine powders, obtained by ball milling the granules as described later, were required to promote solid solution formation in the produced mixtures. FIG. 9a is an image of the thermal spray powders as-received for Sc$_2$SiO$_5$. FIG. 9b is an image of the thermal spray powders as-received for Yb$_2$SiO$_5$. FIG. 9c is an image of the (Yb, Sc)$_2$SiO$_5$ powder after ball milling for 24 hours.

The purity of each starting powder was verified with a PANalytical Empyrean X-ray diffractometer (United Kingdom). Starting powders and sintered products were characterized with)(Pert High Score Plus software to find unit cell parameters and phases present. RE$_2$SiO$_5$ (RE=Sc, Dy, and Er) showed about 5% rare earth oxide or rare earth disilicate impurities. In RE$_2$SiO$_5$ (RE=Y, Nd, and Yb) no additional phases were detected by XRD or energy dispersive spectroscopy (EDS) techniques.

Powders were weighed to an accuracy of +/−0.5 mg and mixed in equimolar ratios by dry ball milling for 24 hours with stabilized zirconia ball mill media. Uniformly mixed powders were then loaded into a 20 mm diameter graphite die and consolidated by spark plasma sintering (SPS) using a Thermal Technologies DCS 25-10 SPS (Santa Rosa, Calif.). The SPS process was performed in argon, with a 10 to 20 minute hold at a maximum temperature and pressure of 1550-1700° C. and 65-70 MPa, respectively. After the SPS process, samples were annealed for 24 hours at 1500° C. in air to remove residual carbon and restore oxygen stoichiometry.

Figure 10:
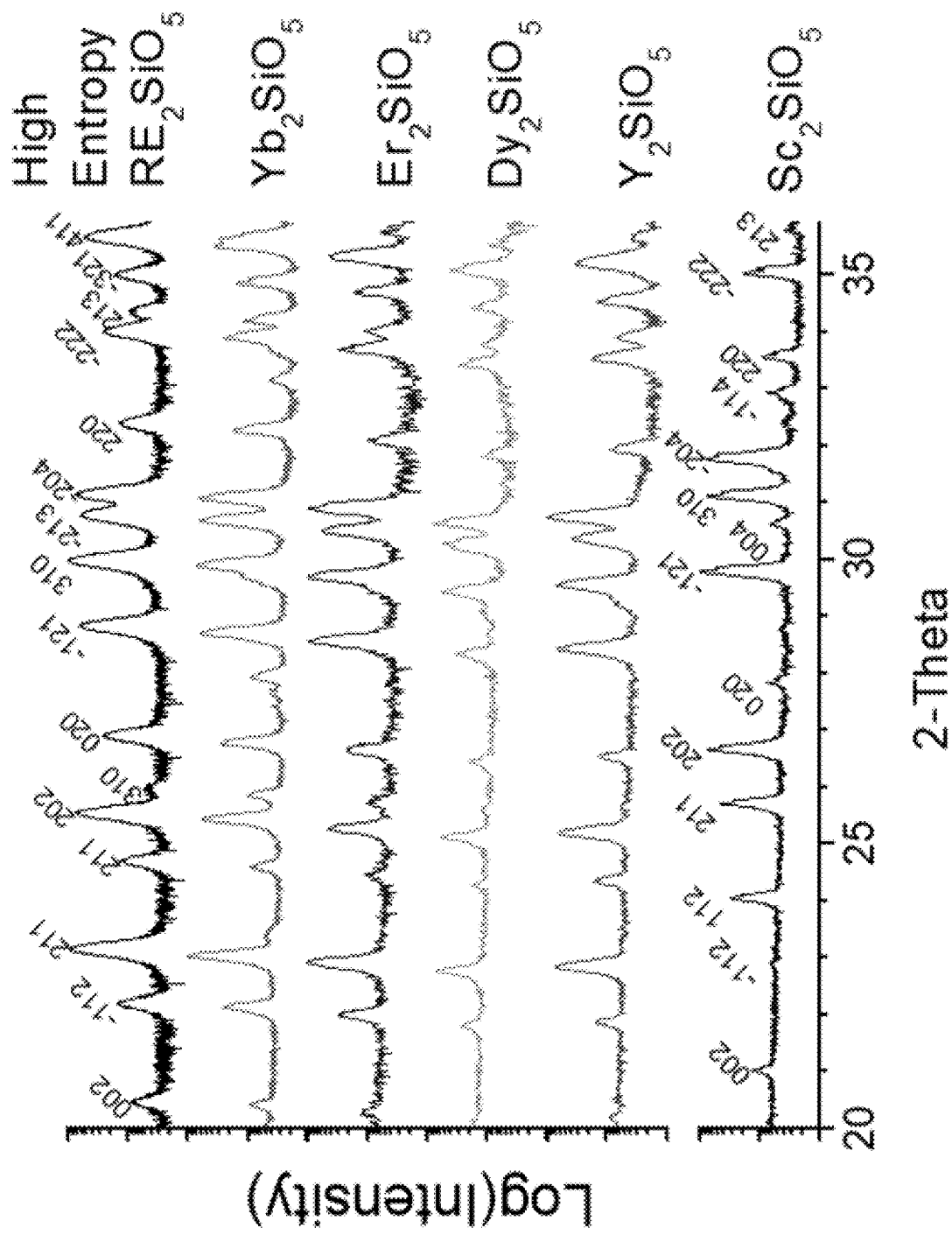

FIG. 10 shows the X-ray diffraction of single cation monosilicates and a high entropy monosilicate RE$_2$SiO$_5$, RE=Sc, Y, Dy, Er, and Yb. Phase purity was characterized with the ICDD XRD patterns in HighScore Plus software. Small peaks corresponding to a 5% disilicate phase are present from impurities in starting powder material. It can be seen that peaks for the high entropy mixture are consolidated, representing a single-phase material. Densities were calculated by ASTM standard (B962-15) Archimedes method. Single cation monosilicates showed densities of 92.5-98.8% relative density, binary solutions showed 90.2-96.2%, and the five-cation solution showed 86.8% relative density. For mixed rare earth cation monosilicates, density was also calculated by Rietveld refinement. Samples were polished to 1 μm using diamond suspension, then thermally treated at 1500° C. for 30 minutes in air to show grains. The microstructures were characterized with FEI Quanta LV200 Scanning Electron Microscope (SEM) with Energy Dispersive Spectroscopy (EDS).

Coefficients of thermal expansion were measured by hot stage XRD with an Anton Parr (Ashland, Va.) HTK 1200N non-ambient stage. Measurements were made in air at 100° C. increments upon heating from room temperature up to 1200° C. with 60° C./min heating rate. At each temperature increment, three XRD scans from 13-60° were acquired consecutively and combined by HighScore Plus software after measurement. Thermal conductivity was measured with Hot Disk, a transient plane source method where a sensor heats a sample through short current pulses and then measures thermal transport by time dependent resistivity changes. Thermal transport is measured by fine control of electronic transport through the sensor, which is geometry dependent. Using this method, both thermal conductivity and thermal diffusivity are measured. The Hot Disk measurements were calibrated over a temperature range from room temperature up to 300° C. by a SiO$_2$ reference sample, and agreed well with literature values. Room temperature values for each sample were measured along with temperature dependence for the five RE cation mixture RE$_2$SiO$_5$ (RE=Sc, Y, Dy, Er, and Yb) up to 300° C.

Figure 11:
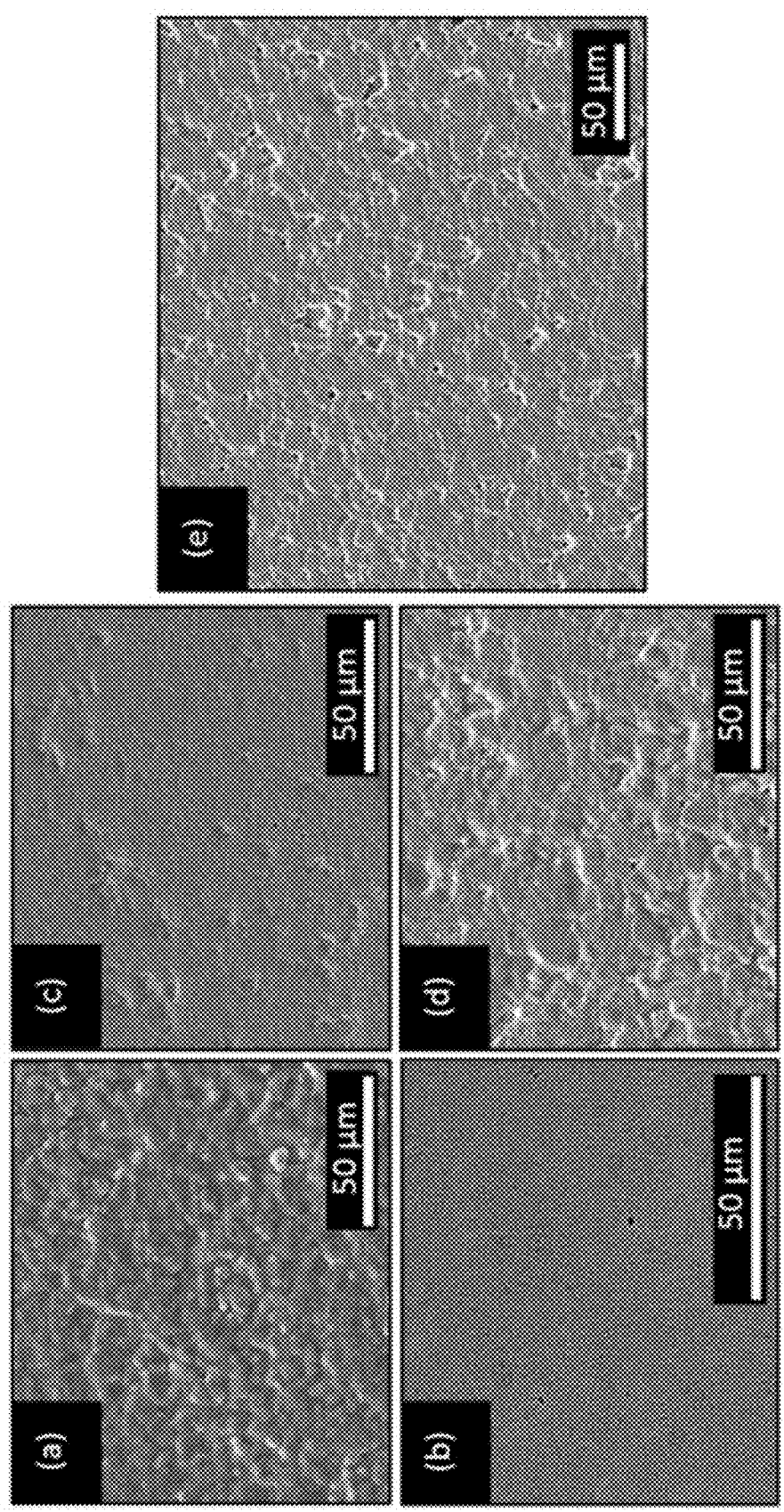

Results—Phase Stability:

FIGS. 11a-e are representative scanning electron micrographs of rare earth monosilicates after polishing and 1500° C. anneal for 30 minutes to show grains. FIG. 11a shows Y$_2$SiO$_5$. FIG. 11b shows Nd$_2$SiO$_5$. FIG. 11c shows (Dy,Er)$_2$SiO$_5$. FIG. 11d shows (Yb,Sc)$_2$SiO$_5$. FIG. 11e shows high Entropy mixture RE$_2$SiO$_5$, where RE=Sc, Y, Dy, Er, Yb.

Figure 12:
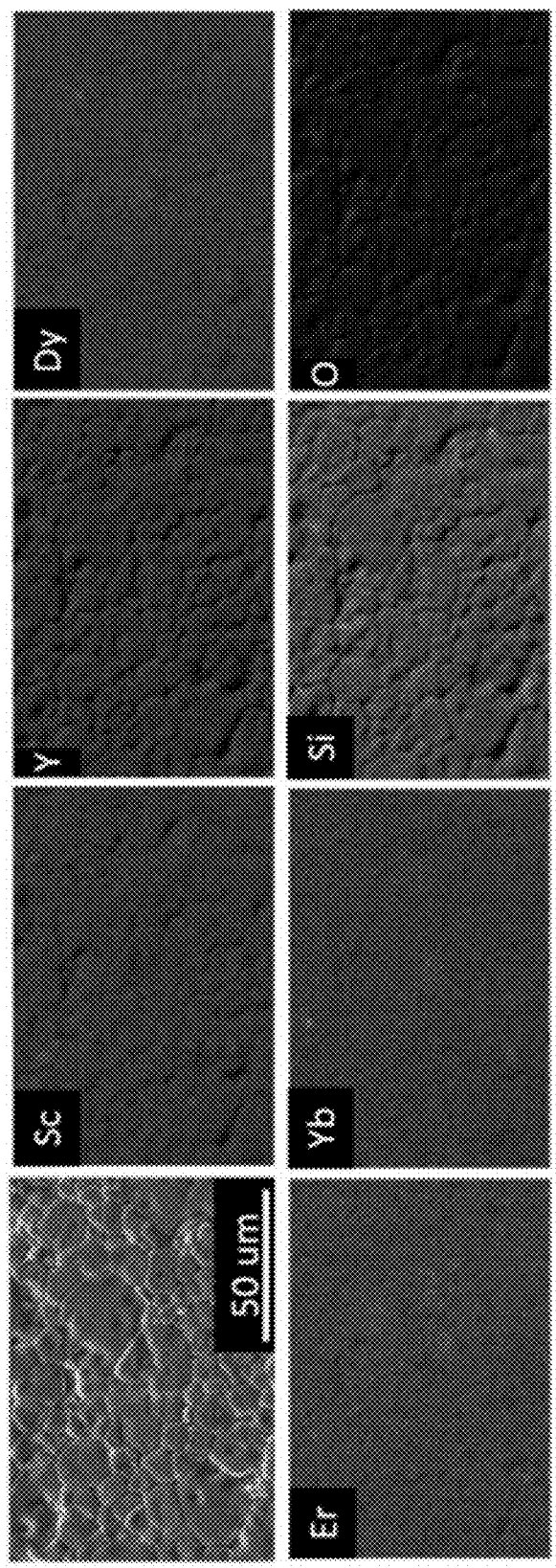

EDS maps of each mixed cation sample (not included) showed solid solution mixing, with 1-10 μm clustering of single cations. The size of rare earth cation clustering corresponds to the size of rare earth oxide RE$_2$O$_3$ and/or disilicate RE$_2$Si$_2$O$_7$ impurities within the starting powders before and after ball milling. This may imply that there is no phase separation of the mixed cation samples after the SPS processing and annealing procedure. Energy dispersive spectroscopy of the five-rare earth cation monosilicate system is shown in FIG. 12.

Figure 13:
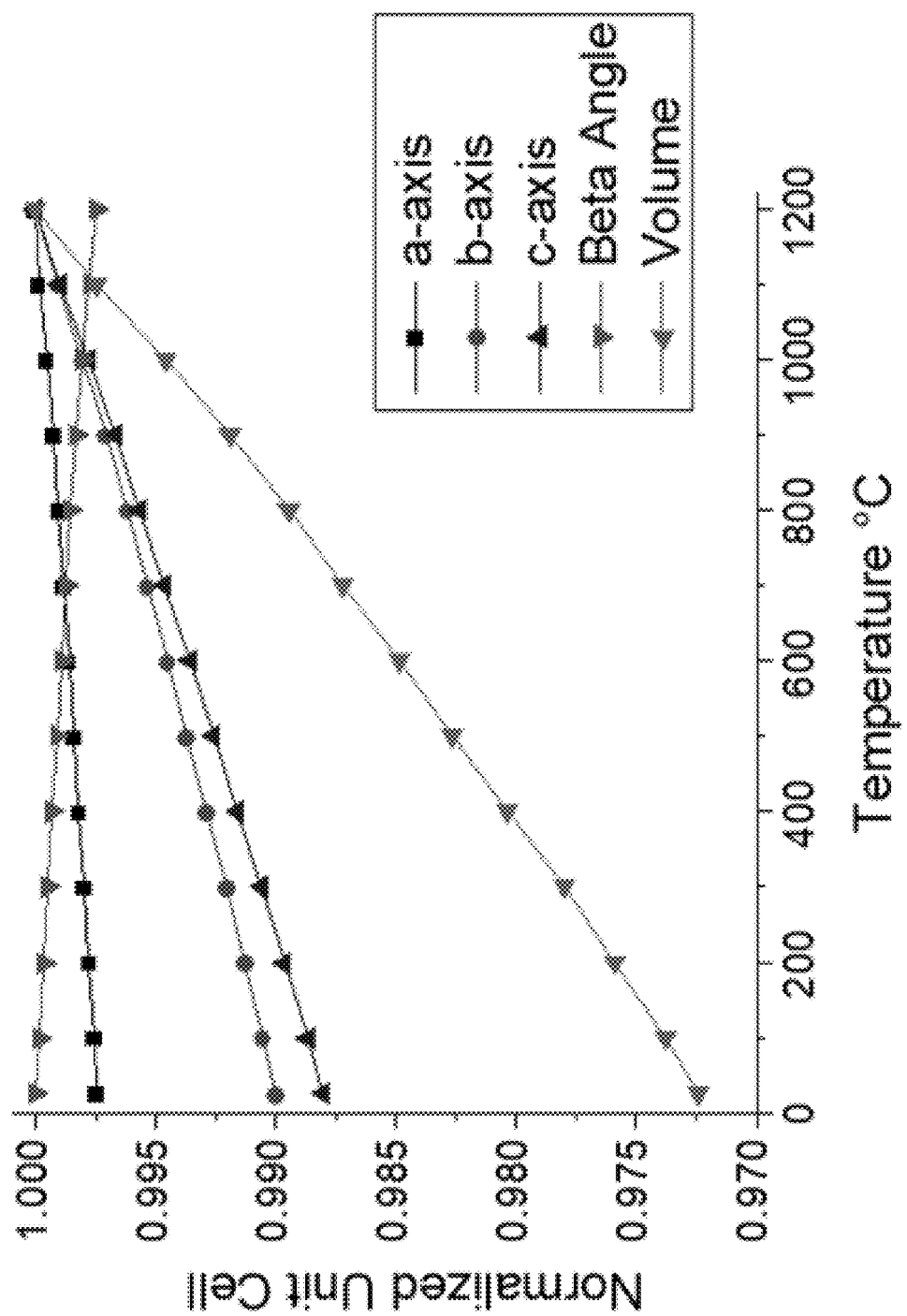

Results—Hot Stage CTE:

Unit cell dimensions for each sample were calculated from the X-ray data for each corresponding temperature. The differences in room temperature unit cell volume parameters were below 0.3% between measured and ICDD database values. Results for the high entropy RE$_2$SiO$_5$ are shown in FIG. 13 as a representative of the temperature dependent unit cell growth, where a, b, c, angle Beta, and unit cell volume are normalized to 1 for comparison. It can be seen that as the unit cell expands, X2 monosilicates show a decrease in the angle Beta as the unit cell moves towards a more orthorhombic type structure.

Sintered samples like those in this study may be prone to show effects of internal stresses upon heating in the X-ray data. A comparison of average axial CTE from 100-1200° C. of Yb$_2$SiO$_5$ powder and sintered sample was made to validate the provided X-ray diffraction data. Powder Yb$_2$SiO$_5$ gave a more linear fit to the directional and linear CTE results in the given temperature range, with lower temperature measurements displaying slightly higher CTE values than that of the sintered sample. This could be representative of low temperature stresses of the sintered material. Still, average axial CTE and volumetric CTE results between powder and sintered Yb$_2$SiO$_5$ samples agreed within 3%, which verified that residual stresses do not significantly impact CTE results.

Figure 14:
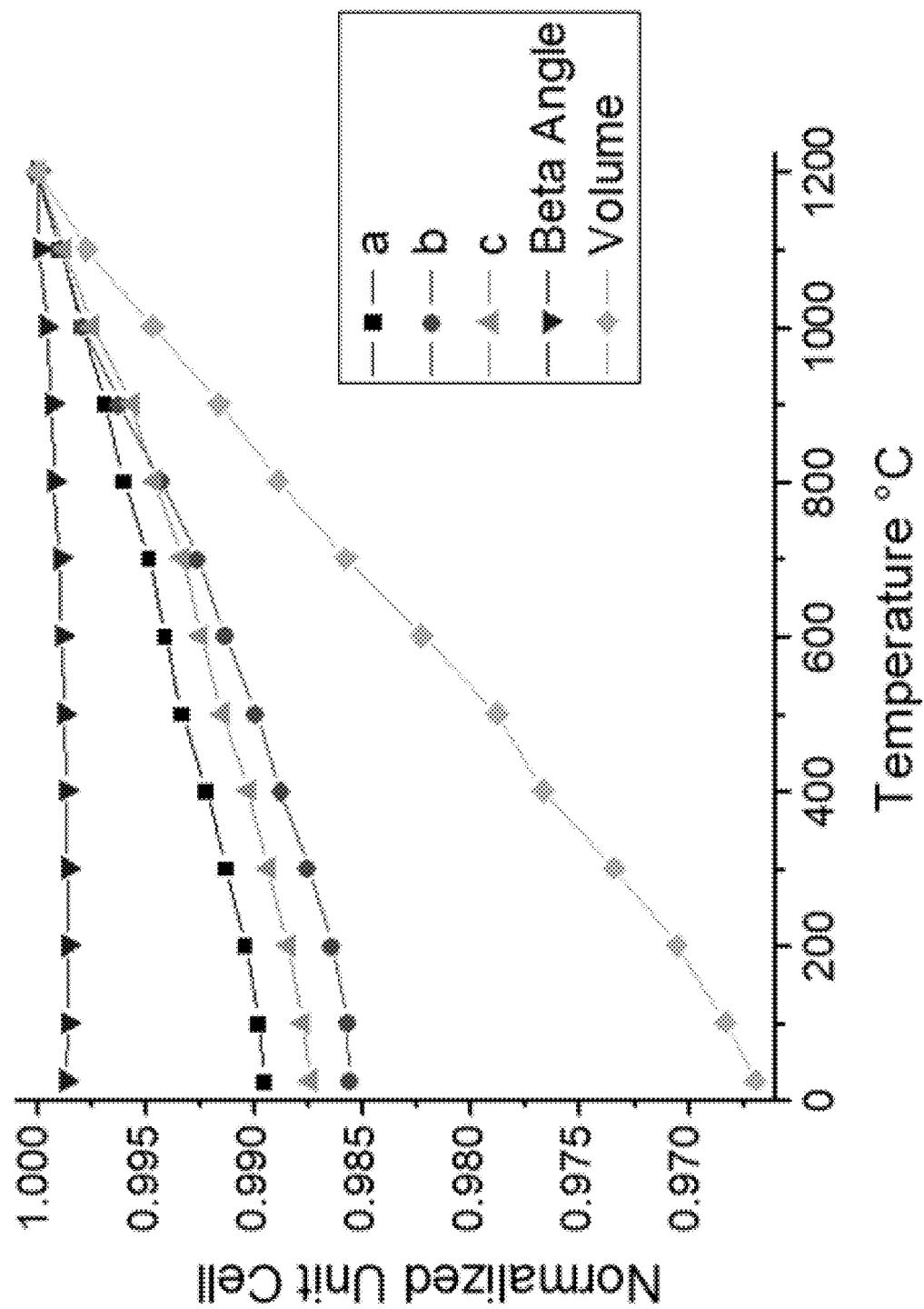

FIG. 14 is a plot of X1 Phase $Nd_2SiO_5$ unit cell expansion from hot stage XRD refinements. Unlike all X2 phase materials, X1 $Nd_2SiO_5$ stood out as the only material to show non-linear variation in unit cell parameters as temperature is increased up to 1200° C., as seen in FIG. 14. Possible implications of this are seen in the CTE calculations of $Nd_2SiO_5$, discussed below.

Linear CTE was calculated from the volume expansion divided by 3 to represent the average CTE in arbitrary directions x, y, and z, by the relationship $$CTE = \frac{1}{3} \frac{\Delta V}{V \Delta T}.$$

Figure 15B:
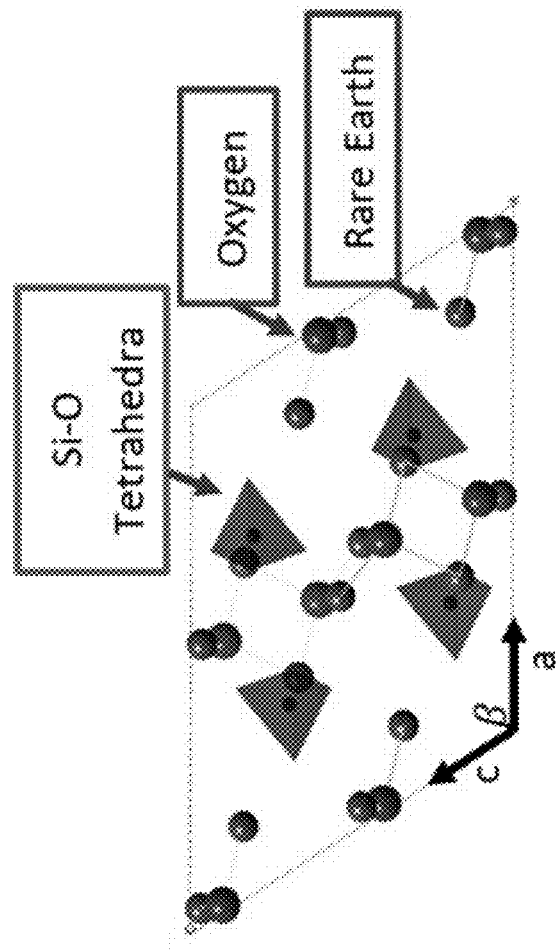
Figure 15A:
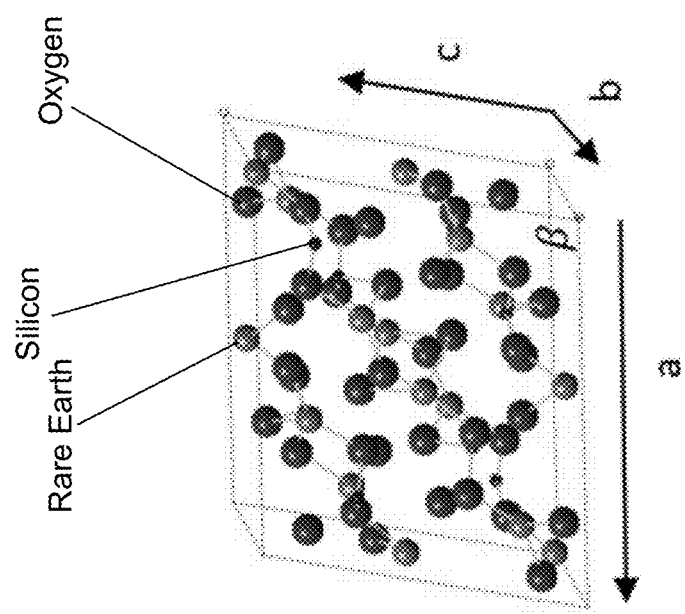

These arbitrary directions do not necessarily correspond to a, b, and c axes due to the Beta angle being unequal to 90°. The CTE of the unit cell axes and Beta angle were calculated similarly, with the reference temperature being 25° C. Each a, b, and c direction and angle Beta for which axial CTE is calculated are defined in FIGS. 15*a* and 15*b*, which show X2 Phase $RE_2SiO_5$ Unit Cell a perspective (FIG. 15*a*) and viewed from the b-axis (FIG. 15*b*). Only oxygen atoms that are not bonded to the Si—O tetrahedra are shown. As labelled, the smaller blue atoms represent silicon, red atoms represent oxygen, and teal atoms represent a rare earth. FIG. 15*b* shows Si—O tetrahedra, with only oxygen atoms that are not bonded from the Si—O tetrahedra. Rare earth cations and the oxygen unbonded to Si form directional chains alongside Si—O tetrahedra parallel to the c-axis direction.

Figure 16:
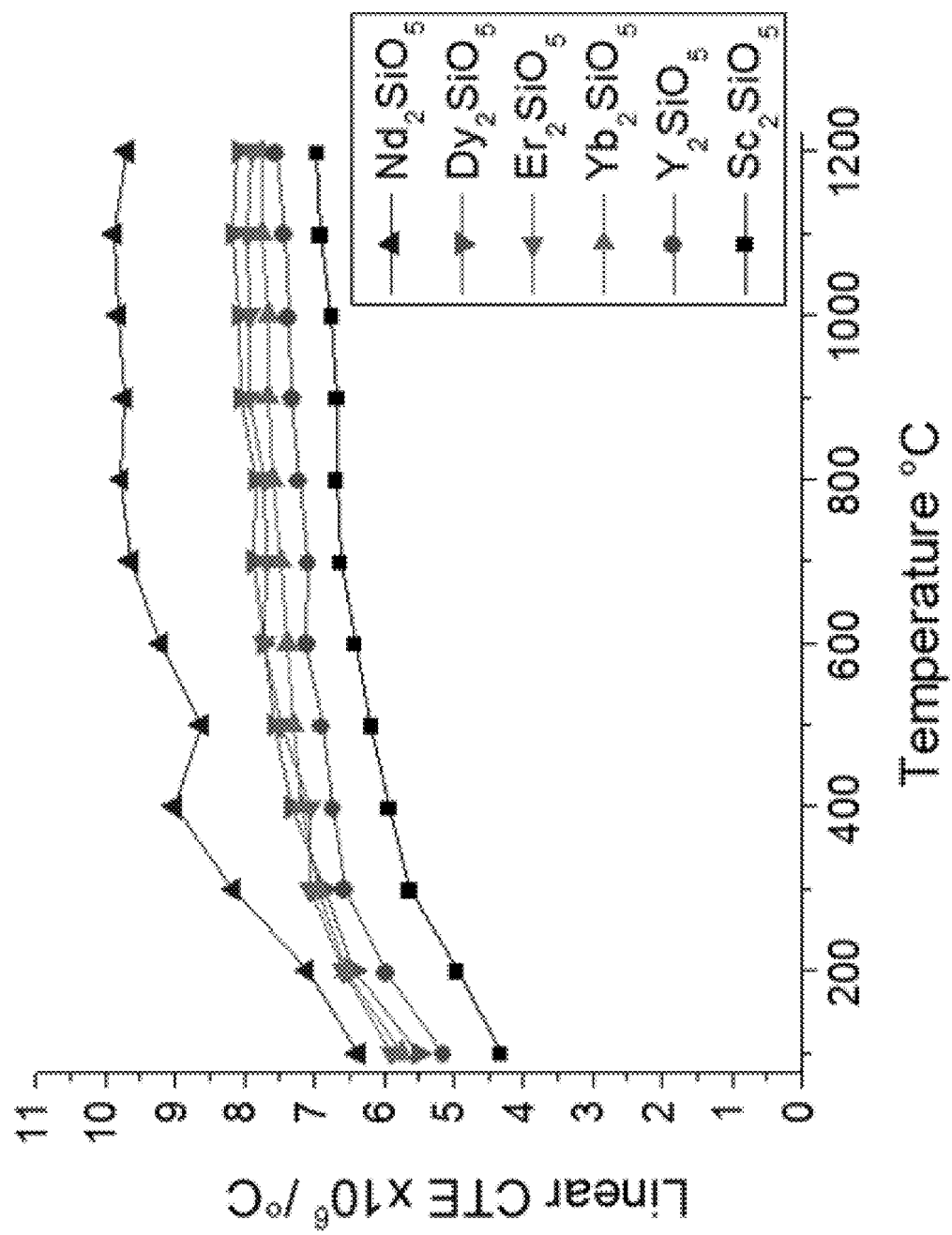

FIG. 16 is a plot of linear CTE for each single cation rare earth monosilicate from 100-1200° C. The averages of the linear CTE for this temperature range are presented in Table 1 below to compare with example literature values. Example literature comparisons of $Yb_2SiO_5$ and $Y_2SiO_5$ were also from hot stage XRD, while all other comparisons come from dilatometric techniques. X1 phase monosilicate $Nd_2SiO_5$ showed a higher linear CTE than all X2 phases in this study. $Sc_2SiO_5$ shows the lowest linear CTE, and has the closest CTE match to SiC, a silicon bond coat, and to low CTE rare earth disilicates EBCs.

TABLE 1

| $RE_2SiO_5$ RE Cation | Measured Linear CTE (XRD) 100-1200° C. × $10^{6\circ}$ C.$^{-1}$ | Literature CTE × $10^{6\circ}$ C.$^{-1}$ | Literature Temperature Range (° C.) |
|---|---|---|---|
| Sc | 6.17 | 6.2[21], 5-6[22] | 400-1400; 200-1400 |
| Y | 6.86 | 6.9[23], *6.9[24] | 200-1350; 100-1200 |
| Nd (X1) | 8.91 | 9.9[3] | 400-1400 |
| Dy | 7.46 | 8[23] | 400-1400 |
| Er | 7.40 | 7.5[25] | 100-1300 |
| Yb | 7.25 | 7.2[23], *6.3[26] | 200-1350, 200-1400 |

Figure 17D:
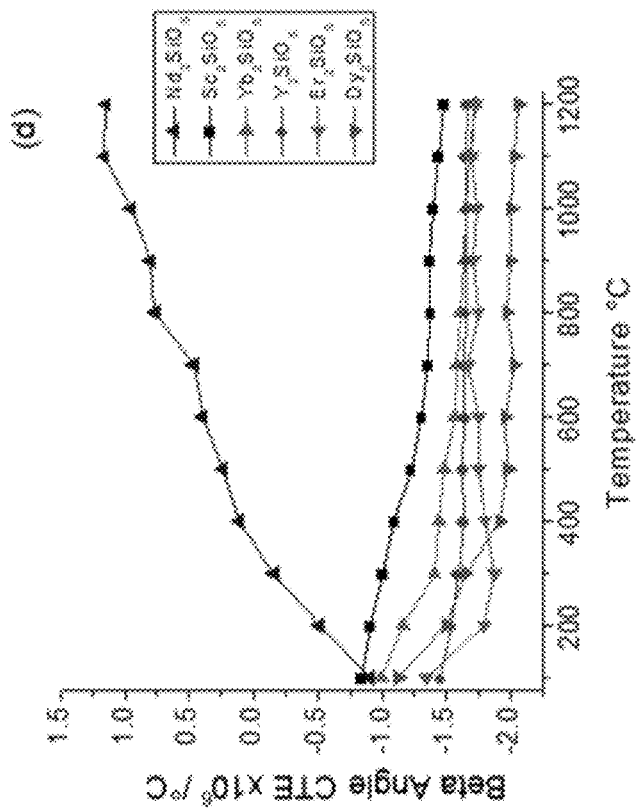
Figure 17C:
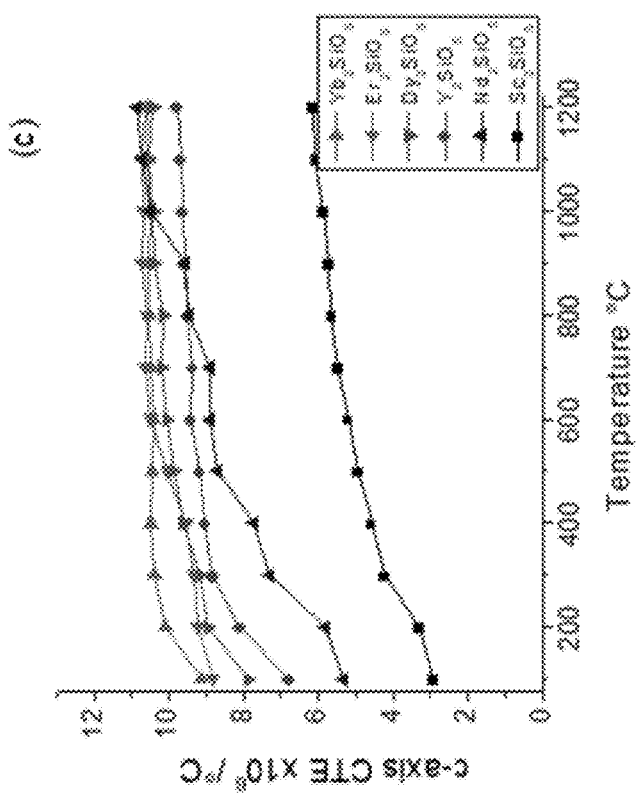

FIGS. 17*a*-17*d* are plots the directional axis CTE values for all single cation rare earth monosilicates. FIG. 17*a* show a-axis CTEs. FIG. 17*b* show b-axis CTEs. FIG. 17*c* shows c-axis CTEs. FIG. 17*d* shows Beta angle CTEs. Initially it was seen that X1-phase $Nd_2SiO_5$ shows unique CTE behavior for each direction of its unit cell. X2 phase monosilicates (Sc, Y, Dy, Er, and Yb) showed a low a-axis CTE below $3.64 \times 10^{-6}$/° C. C-axis CTEs are close to an order of magnitude greater than the a-axis CTEs, with values of 9-10× $10^{-6}$/° C. $Sc_2SiO_5$ showed the lowest linear CTE and least amount of CTE anisotropy of the X2 phase monosilicates. The axis CTE results from single cation monosilicates were used to determine if mixed rare earth cation monosilicates show an average CTE value, or if linear CTE be tailored beyond a rule of mixtures. Additionally, $Sc_2SiO_5$ additions were evaluated as a means to lower the overall degree of internal anisotropy.

Figure 18A:
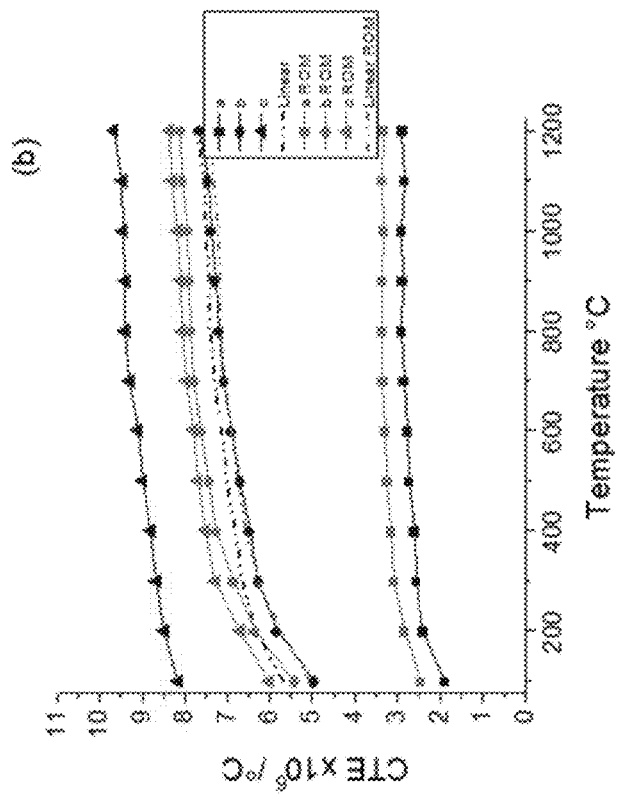
Figure 18B:
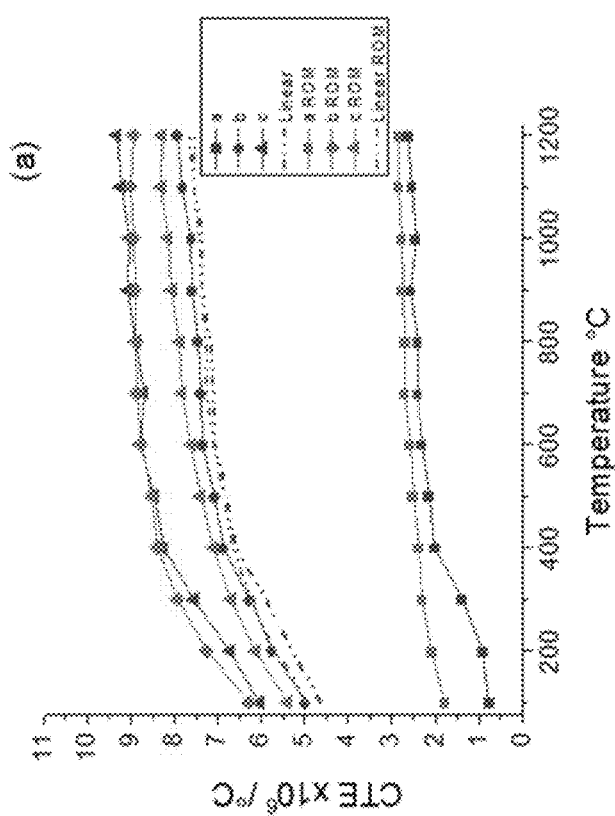
Figure 18C:
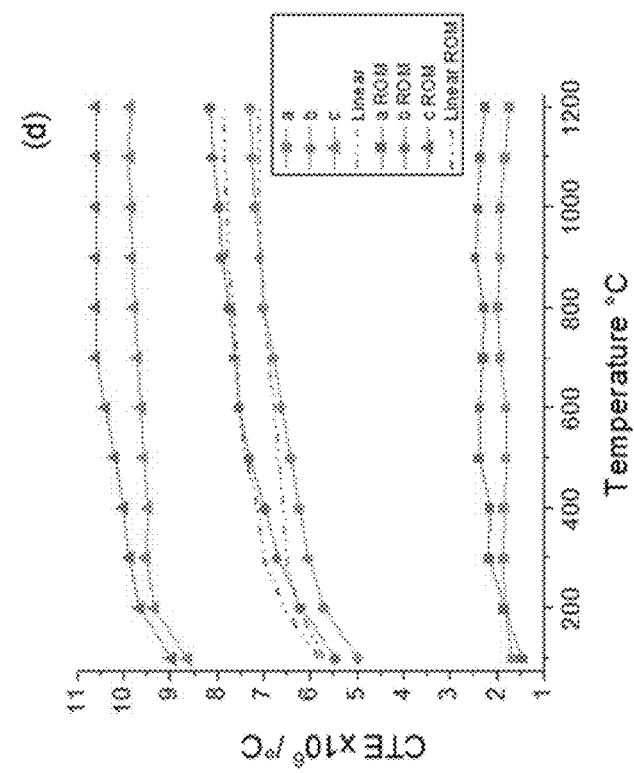
Figure 18D:
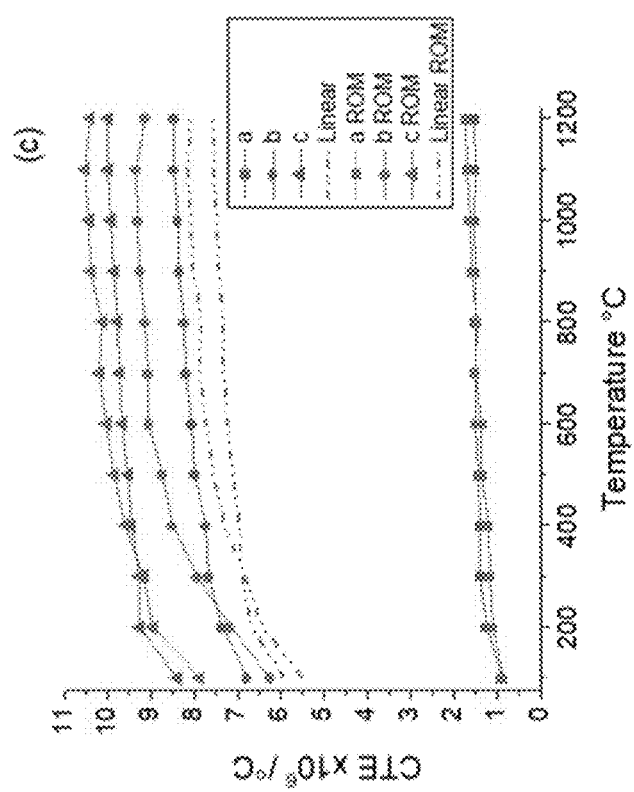

$(RE,RE)_2SiO_5$ of (Dy,Er), (Dy,Sc), (Yb,Sc), and (Yb,Er) axis CTEs are displayed against their rule of mixtures (ROM) average in FIGS. 18*a*-18*d*. For example, plots show axial and Linear CTE values for binary equimolar mixtures $(RE,RE)_2SiO_5$ compared to ROM values calculated form constituent $RE_2SiO_5$ for $(Dy,Sc)_2SiO_5$ (FIG. 18*a*); $(Yb,Sc)_2SiO_5$ (FIG. 18*b*); $(Dy,Er)_2SiO_5$ (FIG. 18*c*); and $(Yb,Er)_2SiO_5$ (FIG. 18*d*). Each axis CTE is labelled on the graph, with a colored and grey line associated with each. The colored lines represent measured CTE values for the given axis. Solid gray lines represent ROM determined by single rare earth cation measurements, shown previously in FIGS. 17*a*-17*d*. Measured linear CTE and the rule of mixtures linear CTE are dotted in color and in gray, respectively. (Yb,Er) and (Dy,Er) mixtures represent combinations of two rare earth cations of similar mass and ionic radii, while (Yb,Sc) and (Dy,Sc) show results of very unique mass and ionic radii. CTE results within $0.5 \times 10^{-6}$/° C. are considered insignificant differences in terms of comparison of results. All systems show linear CTE that are close to ROM, while larger deviations are present in terms of internal CTE anisotropy. The (Dy,Er) and (Yb,Er) mixtures both show slightly lower values than predicted ROM but differences are within $0.5 \times 10^{-6}$/° C.

Figure 19:
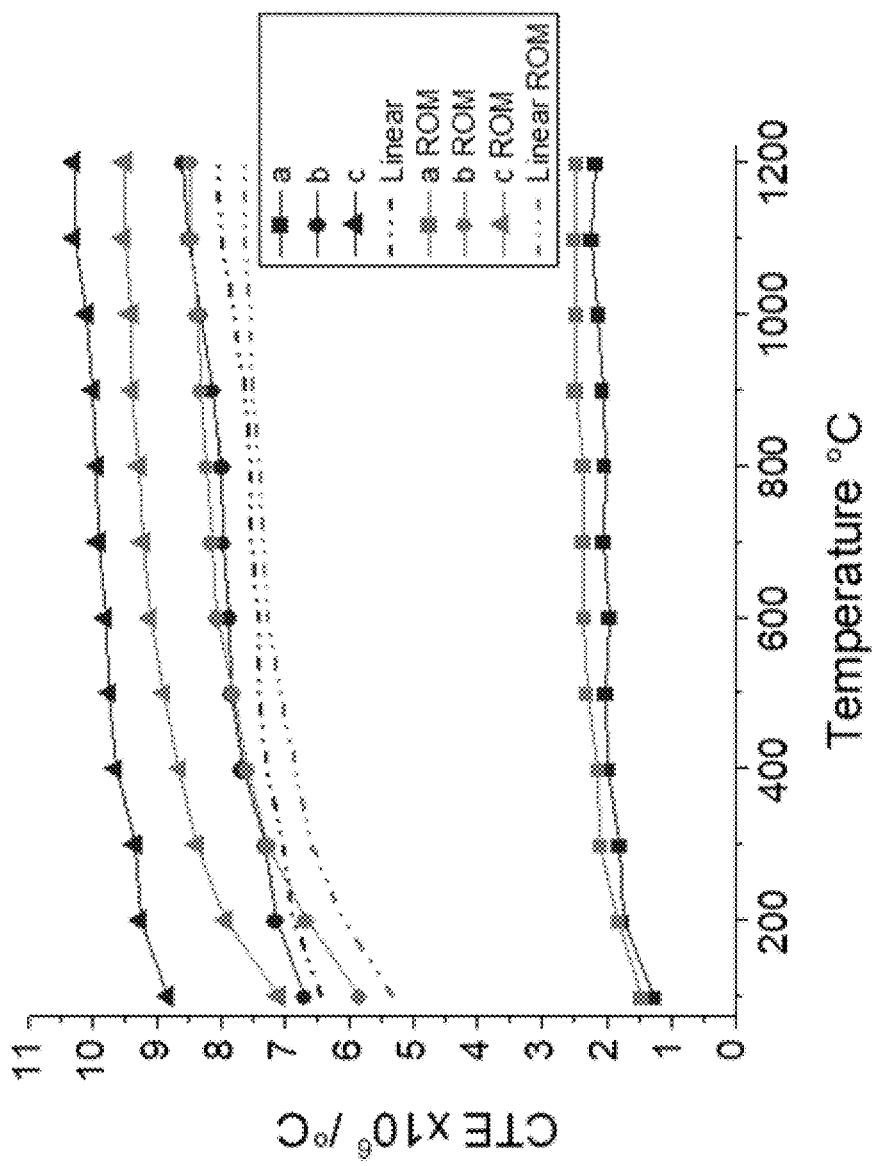

FIG. 19 shows the axial and linear CTEs for the high entropy $RE_2SiO_5$ (RE=Sc, Y, Dy, Er, Yb) in comparison with the predicted rule of mixtures values. From the graph, it was seen that linear CTE (dotted line) does generally follow a ROM. Still, the c-axis CTE, as well as the Beta angle CTE not shown here, show larger differences. This c-axis deviation from ROM shows that scandium additions do not decrease CTE anisotropy for the high entropy mixture as predicted by ROM, even while the linear CTE remains in bounds of a ROM prediction.

Figure 20:
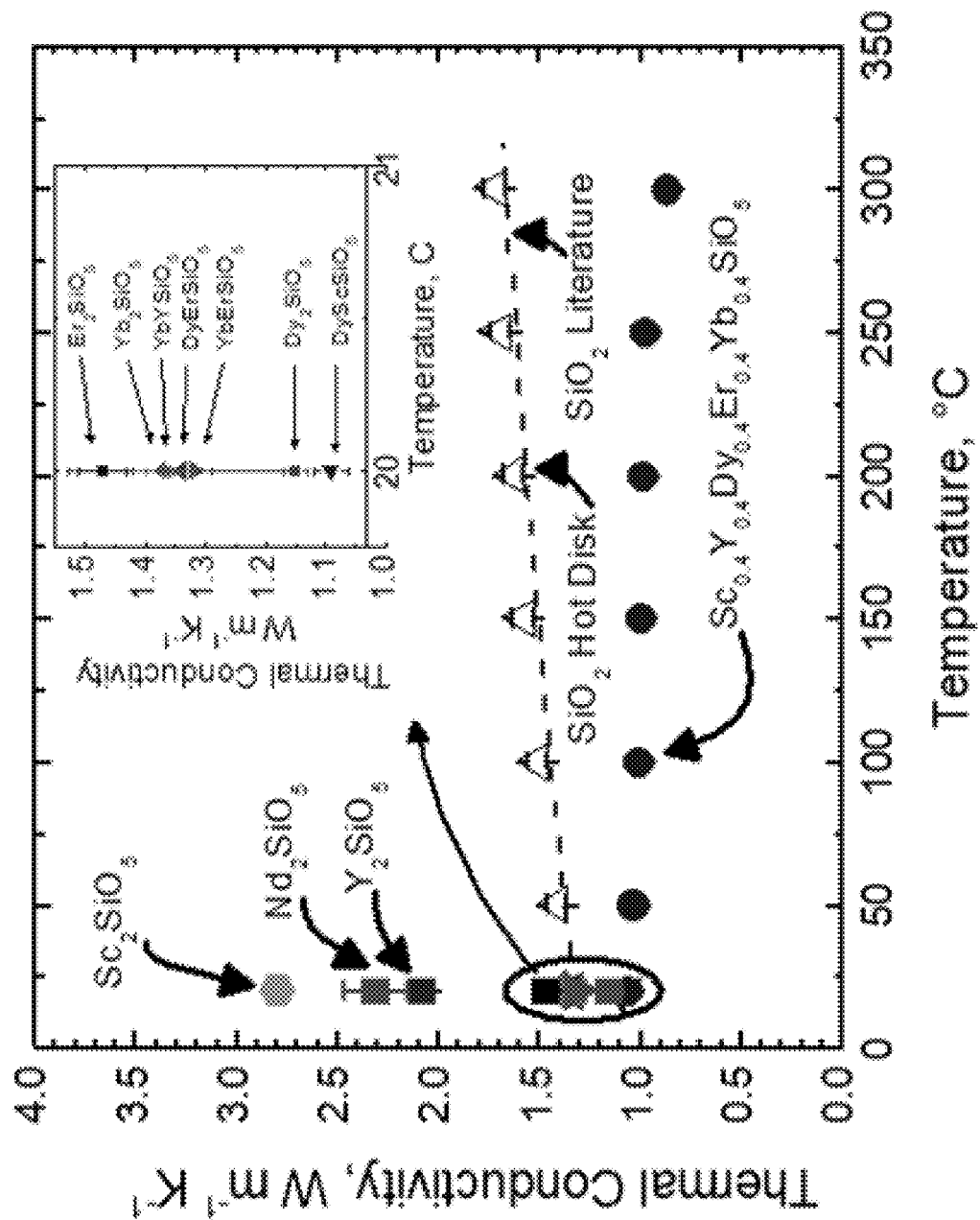

Results—Hot Disk Measurement of Thermal Conductivity:

FIG. 20 is a plot of room temperature thermal conductivity values of $RE_2SiO_5$ measured by Hot Disk method, with values corrected for apparent density. High entropy mixture and $SiO_2$ were measured up to 300° C.

A summary of thermal conductivity values for $RE_2SiO_5$ phases measured via Hot Disk is shown in Table 2. The Hot Disk technique allows for direct measurement of diffusivity (D) and thermal conductivity (κ) with specific heat ($C_P$) being approximated by Neumann-Kopp rule from the constituent oxides. The relationship is $K = DC_p \rho$, where ρ represents the theoretical compound density. Values are corrected for effect of porosity and cracking by the Maxwell-Gernett model $$\kappa_{Solid} = \frac{\kappa_{Porous}}{\left(\frac{1-\phi}{1+\phi}\right)},$$

where ϕ represents the relative porosity percentage of each sample. Values presented in Table 2 are still impacted by other bulk features such as grain boundaries.

TABLE 2

| Rare Earth | Measured W(m K)$^{-1}$ | Std Dev W(m K)$^{-1}$ | Density Corrected W(m K)$^{-1}$ |
|---|---|---|---|
| Sc | 2.41 | 0.05 | 2.80 |
| Y | 1.95 | 0.05 | 2.08 |
| Nd | 2.26 | 0.16 | 2.31 |
| Dy | 1.02 | 0.02 | 1.15 |
| Er | 1.3 | 0.03 | 1.47 |
| Yb | 1.23 | 0.04 | 1.36 |
| Yb, Y | 1.24 | 0.05 | 1.37 |
| Dy, Sc | 1.01 | 0.03 | 1.09 |
| Dy, Er | 1.24 | 0.19 | 1.34 |
| Yb, Er | 1.08 | 0.03 | 1.32 |
| 5 cation | 0.83 | 0.02 | 1.06 |

$Y_2SiO_5$ thermal conductivity was experimentally measured by another source and had a value of 1.86 W/mK at room temperature, which is similar to that of the sample measured in the testing. Literature values of measured room temperature thermal conductivity values are as follows: $Dy_2SiO_5$~1.9 W/mK, $Yb_2SiO_5$~2.2 W/mK, $Er_2SiO_5$~2.7 W/mK, and $Y_2SiO_5$~3.5 W/mK. The samples reported on in this work have slightly lower thermal conductivities, which may be due to microstructural differences such as grain size variations. The ranking of thermal conductivity values in testing remains comparable to both experimental and computational results by other sources. From lowest to highest thermal conductivity: $Dy_2SiO_5$, $Yb_2SiO_5$, $Er_2SiO_5$, and $Y_2SiO_5$. Additionally, hot pressed $Nd_2SiO_5$ from the literature showed a measured thermal conductivity of about 2.8 W/mK at room temperature, which is comparable to the value of 2.31+/−0.16 W/mK presented in this study. The high entropy five cation mixture shows a low room temperature thermal conductivity of 1.06+/−0.02 W/mK which further decreases upon heating up to 300° C. In addition to possessing a thermal conductivity lower than each of the individual or binary cation monosilicates, it shows a temperature trend that suggests a remarkably low thermal conductivity once at service temperatures above 1000° C. This reduction in thermal conductivity of a high entropy ceramic has recently been shown for similar multi-cation high entropy borides and silicides, and entropy stabilized oxides. The thermal conductivity in the current test likely arose from concepts of randomly distributed mass and charge disorder.

Observations—CTE

The results of FIG. 14 show a unique thermal expansion feature of $Nd_2SiO_5$, the representative X1 phase in the testing. While both X1 and X2 monosilicates show a decreasing beta angle at low temperatures, the X1 phase beta angle starts increasing near 300° C. This produces non-linear results in both linear and axial CTE. It was not determined if this trend holds true for other $RE_2SiO_5$ with the X1 structure.

Figure 21:
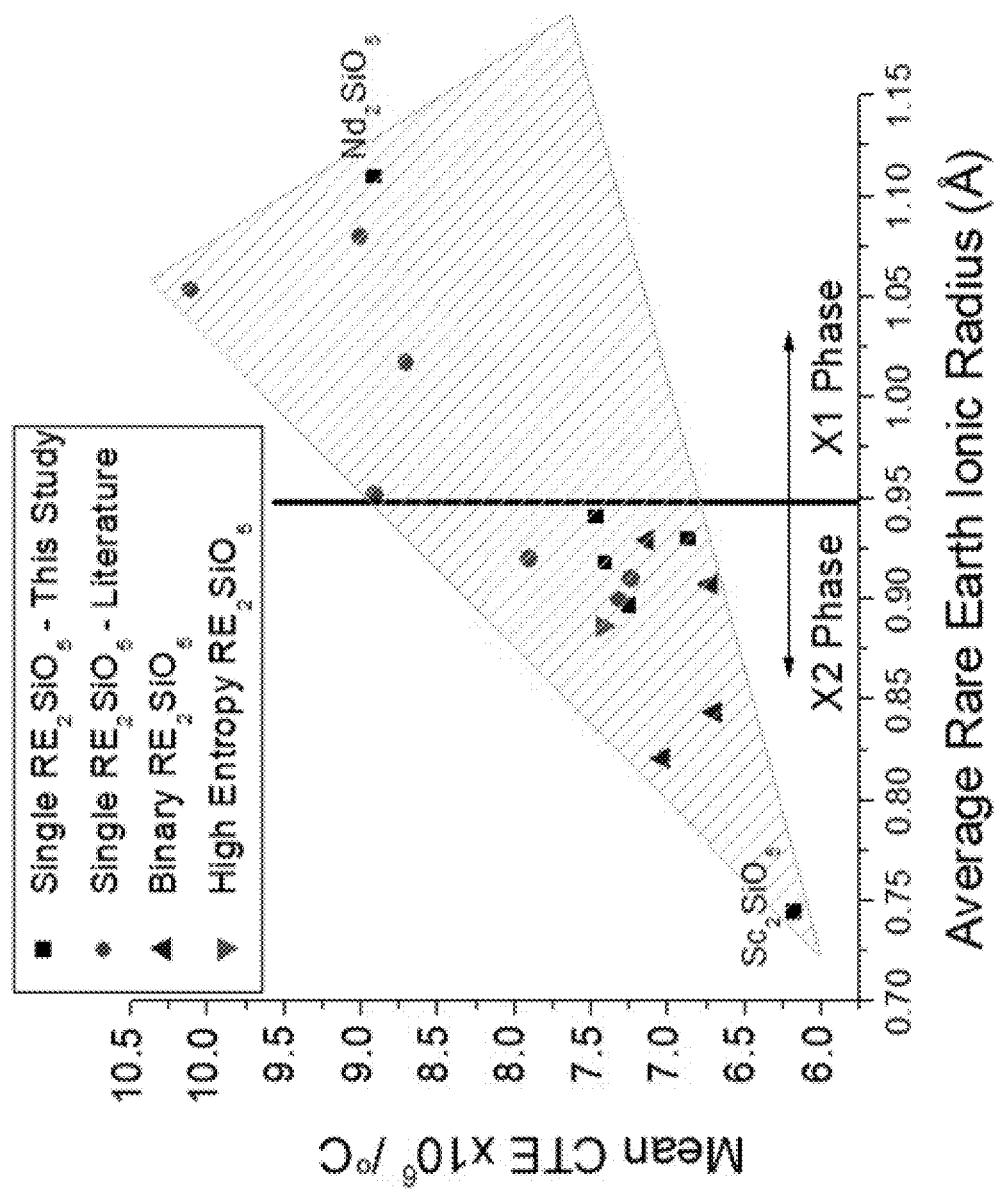

Linear CTE for each sample can be compared to its average ionic radii for the two rare earth cation sites within the unit cell, as shown in FIG. 21. FIG. 21 includes a linear CTE comparison to ionic radii, including all systems in this test along with other literature single cation $RE_2SiO_5$, where RE=Y(X1), Sm, Gd, Tb, Ho, Tm, and Lu. Single cation monosilicates from this study and from literature are presented alongside equimolar RE cation mixtures to display a positive correlation between ionic radii and linear CTE. Points on this graph with ionic radii above 1 Angstrom are X1 phase, while all points below are X2 monosilicates. Other rare earth cations in $RE_2SiO_5$ from literature are as follows: Y(X1), Sm, Gd, Tb, Ho, Tm, and Lu.

Figure 22:
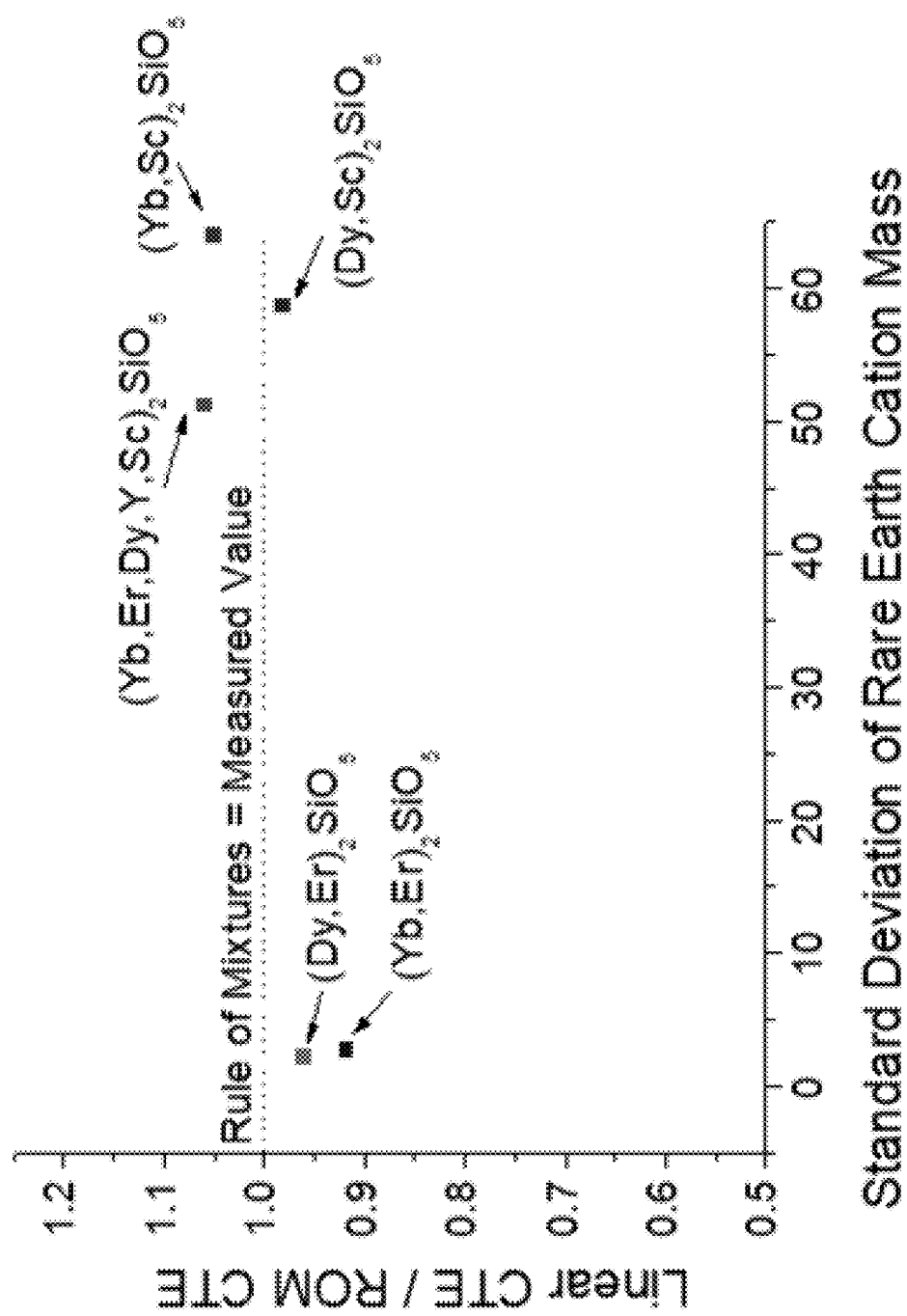

FIG. 22 shows mean CTE ratio compared to differences in rare earth cation mass for $RE_2SiO_5$ mixtures. By comparison of mean CTE ratios with the average cation mass, FIG. 22 shows that there was negligible effect of cation mass differences in mixed cation rare earth monosilicates. Both differences in cation mass and ionic radii of rare earth cations showed minimal changes from rule of mixtures CTE values. Differences in anisotropy between mixed and single rare earth cation monosilicates were also minimal, which showed that additions of $Sc_2SiO_5$ do not decrease internal anisotropy as predicted by rule of mixtures. X2 single cation and mixed monosilicates show linear CTE values between 6-7.5×10$^{-6}$/° C. While these values may result in too large of a CTE mismatch with SiC/SiC CMC and silicon bond coat for a single layer monosilicate T/EBC, a mixed monosilicate-disilicate layer or a monosilicate top coat may be tailored for some example coating systems with these results.

In some cases, rare earth silicates may be characterized as containing strong covalently bonded Si—O tetrahedron and comparatively soft ionically bonded RE-O polyhedra. Further, the Si—O bonding in many silicates have been shown to have near zero thermal expansion, which points to the thermal expansion being governed by rare earth oxygen bonds. Viewing the X2 unit cell along the b-axis helps to explain the anisotropy of X2 monosilicates, as shown in FIG. 15b. The c-axis shows the greatest CTE because this direction has planes where no Si—O tetrahedra inhibit expansion of the rare earth polyhedra. Similarly, the a-axis direction has the highest density of rigid Si—O tetrahedron, which explains the low a-axis CTE of 1-3×10$^{-6}$/° C.

Figure 23:
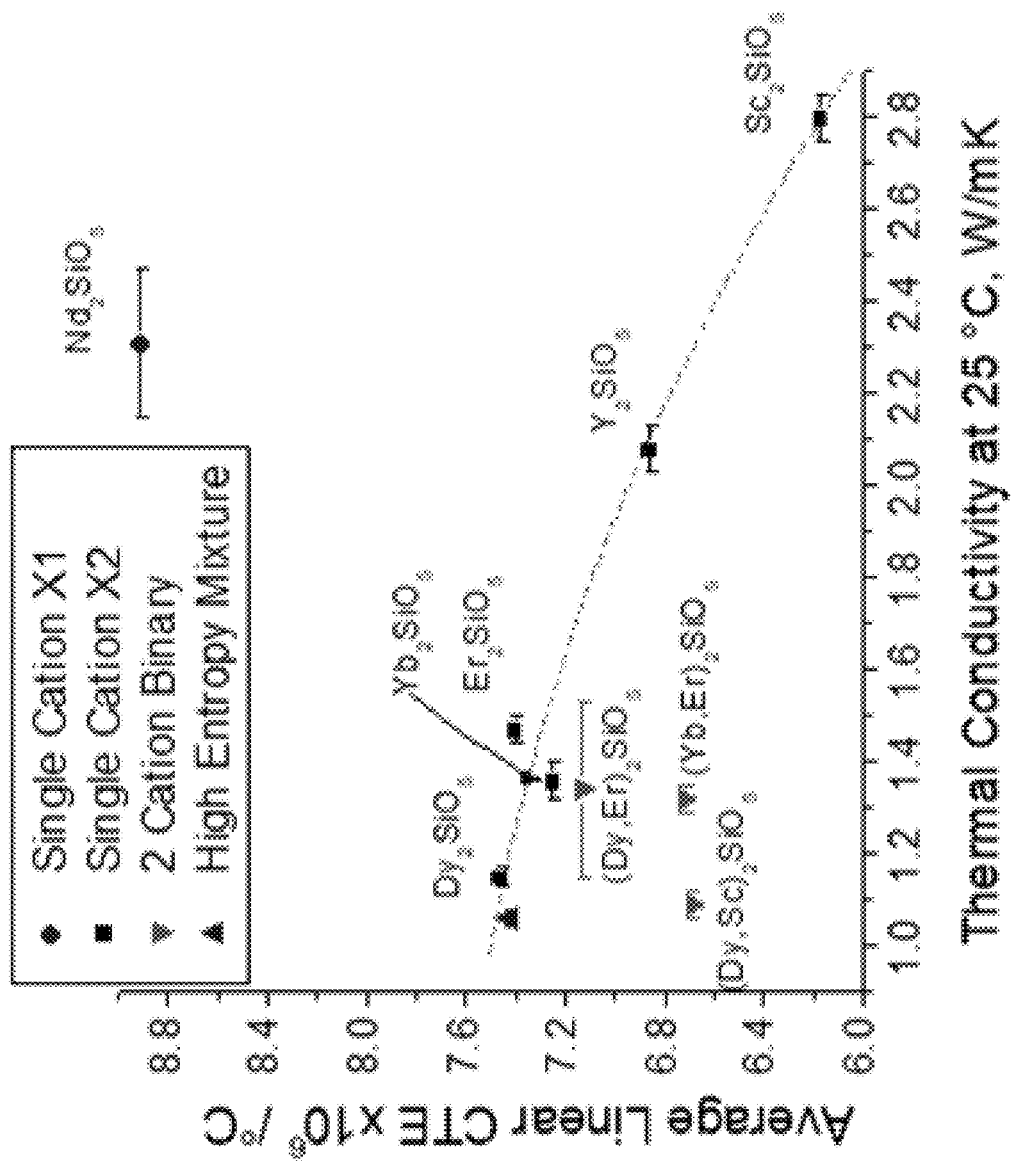

Observations—Thermal Conductivity:

FIG. 23 shows room temperature thermal conductivity measurements compared to average linear CTE (100° C.-1200° C.) for $RE_2SiO_5$ phases. An inverse correlation between linear CTE and thermal conductivity for single rare earth cation X2 monosilicates is seen in FIG. 23, where the fit line is used to guide the eye. For example, $Dy_2SiO_5$ has the largest linear CTE of the single cation monosilicates measured, and also shows the lowest thermal conductivity at room temperature. The X1 phase $Nd_2SiO_5$ does not fit the trend due to significantly different expansion trends. Mixed cation X2 phases have lower thermal conductivities, which may be due to increased phonon scattering with mixed mass and ionic sizes.

Figure 24:
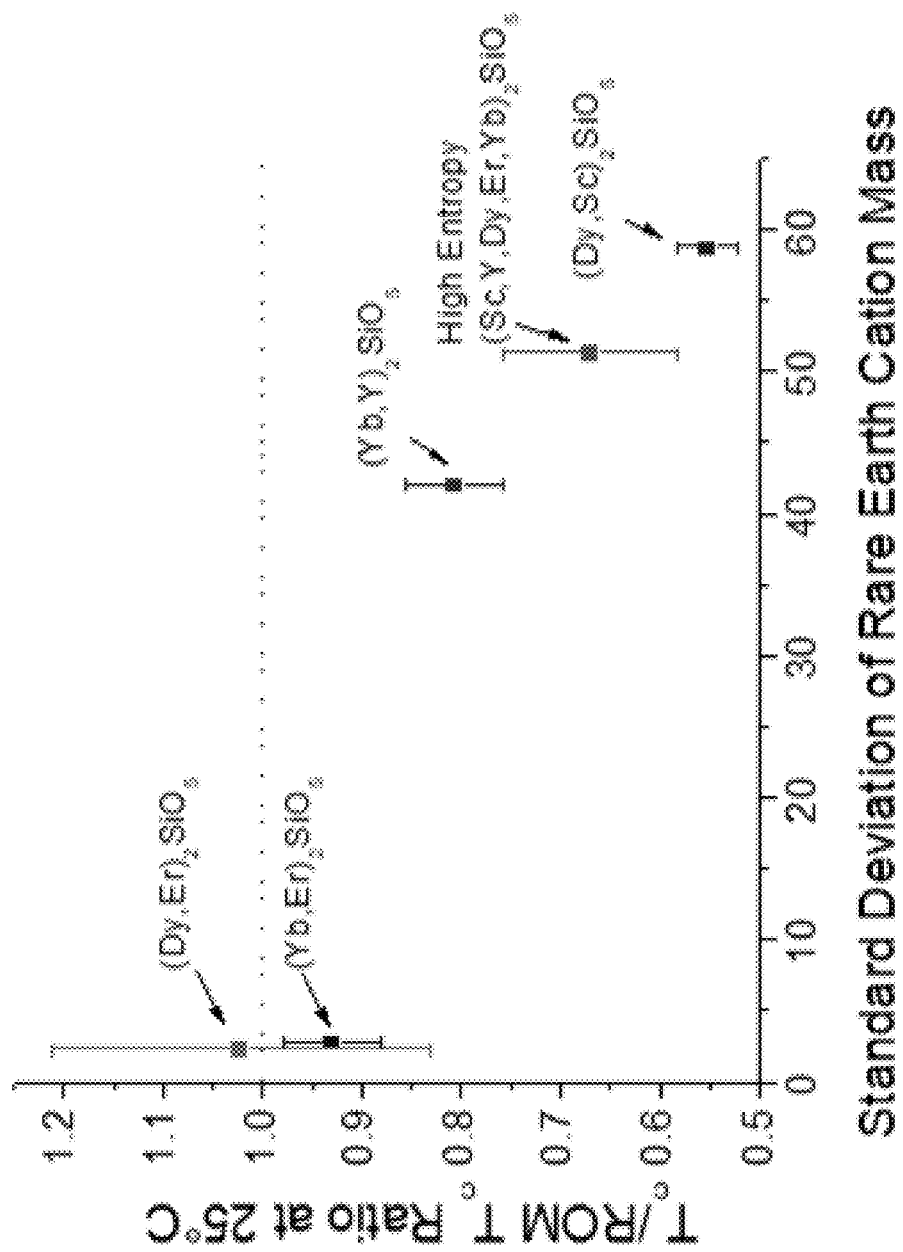

A general trend with mixed cation systems is that mixing decreases thermal conductivity more with each additional cation added in mixing. $(Dy,Er)_2SiO_5$ appears as the only exception in this study, which could arise from differences in bulk defects such as grain size or alternate phases. FIG. 24 shows the ratio of measured and ROM thermal conductivity values plotted against average cation mass for each $RE_2SiO_5$ mixture. There is a trend that the thermal conductivity can be tailored below the ROM value when cation mass differences are greatest, as in the (Dy,Sc) mixture. The high entropy mixture also shows a lowered thermal conductivity ratio due to additional influence on bonding heterogeneity. This trend was validated in other testing where deviations from a ROM thermal conductivity are attributed to phonon scattering from increased lattice disorder, where disorder stems in this case from rare earth cation mass and bonding heterogeneity.

General Observations:

The degree of CTE anisotropy in X2 phase rare earth monosilicates was quantified by high temperature XRD. The results show that scandium monosilicate has a significantly lower degree of CTE anisotropy than other X2 phases. Mixed rare earth cation monosilicates followed a rule of mixtures for tailoring CTE, while a weak dependence of c-axis CTE anisotropy on cation mass is seen. In some examples, the high and anisotropic CTEs may not be appropriate for a single layer EBC material on SiC-based CMCs. Both the high linear CTE and significant CTE anisotropy may be taken into account when considering rare earth monosilicates as part of a T/EBC layer on top of a rare earth disilicate EBC.

Thermal conductivity of mixed rare earth cation monosilicates appeared to follow a rule of mixtures when rare earth cations of similar ionic radii and mass were combined. Thermal conductivity can be reduced by increasing heterogeneity in both cation mass and bonding. The $(Dy,Sc)_2SiO_5$ mixture contained the largest mass difference in rare earth cations and showed the greatest decrease in room temperature thermal conductivity from a ROM. A five-cation high entropy mixture provided the lowest thermal conductivity value, with a room temperature value of 1.06 W/mK that further decreases upon heating to 300° C. The high entropy monosilicate also showed a relatively high CTE of $7.42 \times 10^{-6}/°$ C. which agrees with an inverse correlation between CTE and thermal conductivity observed for single cation X2 phase rare earth monosilicates. The ability to lower thermal conductivity to be near 1 W/mK at room temperature has been shown for mixed rare earth cation monosilicates, and allows for improved thermal insulation in CMC/EBC/TBC systems for future increases in turbine operating temperatures.

Various examples have been described. These and other examples are within the scope of the following claims and clauses.

Clause 1. An article comprising a substrate; and a coating system on the substrate, wherein the coating system includes an thermal and/or environmental barrier coating (T/EBC) layer, wherein the T/EBC layer includes a silicate phase including more than one metal cation.

Clause 2. The article of clause 1, wherein the more than one metal cation includes at least one of a rare earth metal, a transition metal, or an alkaline earth metal.

Clause 3. The article of any of clauses 1 or 2, wherein the silicate phase is a disilicate phase.

Clause 4. The article of any of clauses 1 or 2, wherein the silicate phase is a monosilicate phase.

Clause 5. The article of any of clauses 1 or 2, wherein the T/EBC layer includes a plurality of silicate phases, each of the plurality of silicate phases including the more than one metal cation.

Clause 6. The article of clause 5, wherein the silicate phase comprises a first silicate phase, wherein the plurality of silicate phases includes the first silicate phase and a second silicate phase, wherein the second silicate phase includes the more than one metal cation.

Clause 7. The article of any of clauses 5 or 6, wherein the plurality of silicate phases comprises X number of silicate phases, wherein the more than one metal cation comprises the X number cations.

Clause 8. The article of any of clauses 5 to 7, wherein the plurality of silicate phases includes a monosilicate phase and a disilicate phase.

Clause 9. The article of any of clause 5 to 8, wherein the T/EBC layer consists essentially of the plurality of silicate phases.

Clause 10. The article of clause 9, wherein the T/EBC layer consists of the plurality of silicate phases.

Clause 11. The article of any of clause 1 to 4, wherein the T/EBC layer consists essentially of the silicate phase.

Clause 12. The article of clause 11, wherein the T/EBC layer consists of the silicate phase.

Clause 13. The article of any of clauses 1 to 4, wherein the silicate phase is the only silicate phase of the T/EBC layer.

Clause 14. The article of any of clauses 1 to 13, wherein the T/EBC system comprises a bond layer between the T/EBC layer and the substrate.

Clause 15. A method comprising forming a coating system on a substrate, wherein the coating system including a thermal and/or environmental barrier coating (T/EBC) layer, and wherein the T/EBC layer includes a silicate phase including more than one metal cation.

Clause 16. The method of clause 15, wherein forming the T/EBC system on the bond layer includes mixing a plurality of silicates, wherein each silicate of the plurality of silicates includes one of the one or more cations.

Clause 17. The method of clause 15, wherein the more than one metal cation includes at least one of a rare earth metal, a transition metal, or an alkaline earth metal.

Clause 18. The method of any of clauses 15 to 17, wherein the silicate phase is a disilicate phase.

Clause 19. The method of any of clauses 15 to 17, wherein the silicate phase is a monosilicate phase.

Clause 20. The method of any of clauses 15 to 17, wherein the T/EBC layer includes a plurality of silicate phases, each of the plurality of silicate phases including the more than one metal cation.

Clause 21. The method of clause 20, wherein the silicate phase comprises a first silicate phase, wherein the plurality of silicate phases includes the first silicate phase and a second silicate phase, wherein the second silicate phase includes the more than one metal cation.

Clause 22. The method of any of clauses 20 or 21, wherein the plurality of silicate phases comprises X number of silicate phases, wherein the more than one metal cation comprises the X number cations.

Clause 23. The method of any of clauses 20 to 22, wherein the plurality of silicate phases includes a monosilicate phase and a disilicate phase.

Clause 24. The method of any of clause 20 to 23, wherein the T/EBC layer consists essentially of the plurality of silicate phases.

Clause 25. The method of clause 24, wherein the T/EBC layer consists of the plurality of silicate phases.

Clause 26. The method of any of clause 15 to 19, wherein the T/EBC layer consists essentially of the silicate phase.

Clause 27. The method of clause 26, wherein the T/EBC layer consists of the silicate phase.

Clause 28. The method of any of clauses 15 to 19, wherein the silicate phase is the only silicate phase of the T/EBC layer.

Clause 29. The method of any of clauses 15 to 28, wherein the T/EBC system comprises a bond layer between the T/EBC layer and the substrate.

What is claimed is:
1. An article comprising:
a substrate; and
a coating system on the substrate, wherein the coating system includes a thermal and/or environmental barrier coating (T/EBC) layer, wherein the T/EBC layer includes a silicate phase including a mixture of exactly five different rare earth metal cations.
2. The article of claim 1, wherein the silicate phase is a disilicate phase including the five different rare earth metal cations.

3. The article of claim 1, wherein the silicate phase is a monosilicate phase including the five different rare earth metal cations.

4. The article of claim 1, wherein the T/EBC layer includes a plurality of silicate phases, each of the plurality of silicate phases including more than two different rare earth metal cations of the five different rare earth metal cations.

5. The article of claim 4, wherein the plurality of silicate phases includes a monosilicate phase and a disilicate phase.

6. The article of claim 4, wherein the T/EBC layer consists essentially of the plurality of silicate phases.

7. The article of claim 1, wherein the T/EBC layer consists essentially of the silicate phase.

8. The article of claim 1, wherein the silicate phase is the only silicate phase of the T/EBC layer.

9. The article of claim 1, wherein five different rare earth metal cations of the silicate phase are such that the T/EBC layer exhibits a lower coefficient of thermal expansion compared to a layer including the silicate phase with only a single rare earth metal cation of the five different rare earth metal cations.

10. The article of claim 1, wherein the five different rare earth metal cations of the silicate phase are such that the T/EBC layer exhibits a lower thermal conductivity compared to a layer including the silicate phase with only a single rare earth metal cation of the five different rare earth metal cations.

11. The article of claim 1, wherein the five different rare earth metal cations of the silicate phase are such that the T/EBC layer exhibits increased CMAS resistance compared to a layer including the silicate phase with only a single rare earth metal cation of the five different rare earth metal cations.

12. The article of claim 1, wherein the five different rare earth metal cations consist of Ytterbium (Yb), Dysprosium (Dy), Erbium (Er), Yttrium (Y), and Scandium (Sc).

13. An article comprising:
a substrate; and
a coating system on the substrate, wherein the coating system includes a thermal and/or environmental barrier coating (T/EBC) layer, wherein the T/EBC layer includes a silicate phase including a mixture of exactly five different rare earth metal cations, the five different rare earth metal cations selected such that the T/EBC layer exhibits a density-corrected thermal conductivity of less than or equal to 1.06 Watts per meter Kelvin (W/mK) when measured according to a hot disk technique.

14. The article of claim 13, wherein the T/EBC layer includes a silicate phase including an equimolar mixture of the five different rare earth metal cations.

15. The article of claim 14, wherein the five different rare earth metal cations are Ytterbium (Yb), Dysprosium (Dy), Erbium (Er), Yttrium (Y), and Scandium (Sc).

16. The article of claim 13, wherein the density-corrected thermal conductivity is measured at room temperature.

* * * * *